United States Patent
Tumanov et al.

(10) Patent No.: US 9,626,768 B2
(45) Date of Patent: Apr. 18, 2017

(54) OPTIMIZING A VISUAL PERSPECTIVE OF MEDIA

(71) Applicant: Microsoft Technology Licensing, LLC, Redmond, WA (US)

(72) Inventors: Ilya Tumanov, Redmond, WA (US); David Benjamin Lee, Sammamish, WA (US); Jennifer Michelstein Halberstam, Kirkland, WA (US); Nathaniel George Freier, Seattle, WA (US); Karim T. Farouki, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/503,192

(22) Filed: Sep. 30, 2014

(65) Prior Publication Data

US 2016/0093059 A1 Mar. 31, 2016

(51) Int. Cl.
*G06K 9/00* (2006.01)
*G06T 7/00* (2017.01)
*G06T 11/60* (2006.01)

(52) U.S. Cl.
CPC .......... *G06T 7/0081* (2013.01); *G06T 11/60* (2013.01); *G06T 2207/10004* (2013.01)

(58) Field of Classification Search
CPC ........... G06T 11/60; G06T 2207/10004; G06T 7/0081
See application file for complete search history.

(56) References Cited

U.S. PATENT DOCUMENTS

| | | | |
|---|---|---|---|
| 5,031,121 | A | 7/1991 | Iwai et al. |
| 5,911,146 | A | 6/1999 | Johari et al. |
| 6,694,053 | B1 | 2/2004 | Burns et al. |
| 6,711,291 | B1 | 3/2004 | Stubler et al. |

(Continued)

FOREIGN PATENT DOCUMENTS

| | | |
|---|---|---|
| EP | 1555634 A1 | 7/2005 |
| EP | 2584509 A1 | 4/2013 |

(Continued)

OTHER PUBLICATIONS

Abidi, Syed Sibte Raza. "Intelligent Information Personalization; From Issues to Strategies." (2008).*

(Continued)

*Primary Examiner* — Li Liu
(74) *Attorney, Agent, or Firm* — Jacob P. Rohwer; Newport IP, LLC

(57) ABSTRACT

One or more signals are used to identify regions of interest of an image. The signals are applied to the image to generate one or more models that are based on the regions of interest. The models may present different perspectives of the image by emphasizing various features and focal points. The models may be ranked and displayed according to a scoring paradigm that is based on one or more signals. Multi-tiered feedback mechanisms allow for the collection of user intent and/or other forms of explicit input. Feedback associated to the models may be obtained and used to generate additional models that are based on one or more signals and the feedback. The feedback may also be stored and utilized for machine learning purposes.

17 Claims, 18 Drawing Sheets

(56) References Cited

U.S. PATENT DOCUMENTS

| | | | |
|---|---|---|---|
| 7,064,759 B1 | 6/2006 | Feierbach et al. | |
| 7,133,571 B2 | 11/2006 | Cheatle | |
| 7,260,245 B2 | 8/2007 | Harrington et al. | |
| 7,290,006 B2 | 10/2007 | Xie et al. | |
| 7,308,116 B2 | 12/2007 | Harrington et al. | |
| 7,466,875 B1 | 12/2008 | Siegel et al. | |
| 7,561,722 B2 | 7/2009 | Harrington | |
| 7,609,847 B2 | 10/2009 | Widdowson et al. | |
| 7,743,323 B1 | 6/2010 | Rodriguez | |
| 7,895,197 B2 | 2/2011 | Meyer et al. | |
| 7,978,918 B2 | 7/2011 | Scalise et al. | |
| 8,175,376 B2 | 5/2012 | Marchesotti et al. | |
| 8,363,984 B1 | 1/2013 | Goldman | |
| 8,379,055 B2 | 2/2013 | Lam et al. | |
| 8,406,515 B2 | 3/2013 | Cheatle | |
| 8,462,394 B2 | 6/2013 | Fan et al. | |
| 8,479,092 B1 | 7/2013 | Pandey | |
| 8,572,209 B2 | 10/2013 | Healey et al. | |
| 8,577,913 B1 | 11/2013 | Hansson | |
| 8,660,351 B2 | 2/2014 | Tang | |
| 8,700,604 B2 | 4/2014 | Roseman et al. | |
| 9,009,092 B2 * | 4/2015 | Michelstein et al. | 706/45 |
| 2002/0113801 A1 | 8/2002 | Reavy et al. | |
| 2003/0056177 A1 | 3/2003 | Nara et al. | |
| 2003/0080995 A1 | 5/2003 | Tenenbaum et al. | |
| 2004/0013302 A1 | 1/2004 | Ma et al. | |
| 2004/0024613 A1 | 2/2004 | Harnngton et al. | |
| 2004/0205643 A1 | 10/2004 | Harrington | |
| 2005/0060664 A1 | 3/2005 | Rogers | |
| 2005/0125725 A1 | 6/2005 | Gatt | |
| 2005/0157926 A1 | 7/2005 | Moravec et al. | |
| 2006/0044324 A1 | 3/2006 | Shum et al. | |
| 2006/0104511 A1 | 5/2006 | Guo et al. | |
| 2006/0200759 A1 * | 9/2006 | Agrawala et al. | 715/517 |
| 2007/0027830 A1 | 2/2007 | Simons et al. | |
| 2007/0028165 A1 | 2/2007 | Cole | |
| 2007/0156747 A1 | 7/2007 | Samuelson | |
| 2007/0174291 A1 | 7/2007 | Cooper et al. | |
| 2007/0204220 A1 | 8/2007 | Nickolov et al. | |
| 2007/0257929 A1 | 11/2007 | Wade et al. | |
| 2007/0299821 A1 | 12/2007 | McCully et al. | |
| 2007/0300185 A1 | 12/2007 | Macbeth et al. | |
| 2008/0301126 A1 | 12/2008 | Asai | |
| 2009/0240677 A1 | 9/2009 | Parekh et al. | |
| 2010/0017704 A1 | 1/2010 | Jaffe et al. | |
| 2010/0036717 A1 | 2/2010 | Trest | |
| 2010/0046842 A1 | 2/2010 | Conwell | |
| 2010/0153841 A1 | 6/2010 | Haug, III et al. | |
| 2010/0156919 A1 | 6/2010 | Bala et al. | |
| 2010/0251086 A1 | 9/2010 | Haumont | |
| 2010/0318888 A1 | 12/2010 | Leshner et al. | |
| 2010/0328725 A1 | 12/2010 | Gaucas | |
| 2011/0016421 A1 | 1/2011 | Krupka et al. | |
| 2011/0029635 A1 | 2/2011 | Shkurko et al. | |
| 2011/0060761 A1 | 3/2011 | Fouts | |
| 2011/0157226 A1 * | 6/2011 | Ptucha et al. | 345/638 |
| 2011/0161308 A1 | 6/2011 | Andersen et al. | |
| 2011/0231754 A1 | 9/2011 | Campbell et al. | |
| 2011/0305397 A1 | 12/2011 | Piramuthu et al. | |
| 2012/0059838 A1 | 3/2012 | Berntson et al. | |
| 2012/0079400 A1 | 3/2012 | Nauerz | |
| 2012/0099158 A1 | 4/2012 | Matsunaga et al. | |
| 2012/0159314 A1 * | 6/2012 | Schrier et al. | 715/252 |
| 2012/0278704 A1 * | 11/2012 | Ying et al. | 715/243 |
| 2012/0303706 A1 | 11/2012 | Young et al. | |
| 2013/0036113 A1 * | 2/2013 | Damera-Venkata et al. | 707/724 |
| 2013/0073998 A1 | 3/2013 | Migos et al. | |
| 2013/0108122 A1 | 5/2013 | Ptucha | |
| 2013/0108168 A1 | 5/2013 | Ptucha | |
| 2013/0211819 A1 | 8/2013 | Kagan et al. | |
| 2013/0212487 A1 | 8/2013 | Cote | |
| 2013/0246926 A1 | 9/2013 | Vemireddy | |
| 2013/0254655 A1 | 9/2013 | Nykyforov | |
| 2013/0262988 A1 | 10/2013 | Nakagawa | |
| 2013/0272611 A1 | 10/2013 | Nakamura et al. | |
| 2013/0346843 A1 | 12/2013 | Murray | |
| 2014/0006424 A1 | 1/2014 | Al-Kofahi et al. | |
| 2014/0025619 A1 | 1/2014 | Michelstein et al. | |
| 2014/0025650 A1 | 1/2014 | Lee et al. | |
| 2014/0026038 A1 | 1/2014 | Lee et al. | |
| 2014/0032529 A1 | 1/2014 | Chang et al. | |
| 2014/0075280 A1 | 3/2014 | Laakmann et al. | |
| 2014/0075289 A1 * | 3/2014 | Brant | 715/234 |
| 2014/0149845 A1 | 5/2014 | Ansel et al. | |
| 2014/0164911 A1 | 6/2014 | Nickolov et al. | |
| 2014/0189525 A1 | 7/2014 | Trevisiol et al. | |
| 2014/0208203 A1 | 7/2014 | Tang et al. | |
| 2014/0215312 A1 | 7/2014 | Hicks et al. | |
| 2014/0281847 A1 | 9/2014 | Marra et al. | |
| 2015/0019545 A1 * | 1/2015 | Chedeau et al. | 707/725 |
| 2015/0019958 A1 * | 1/2015 | Ying et al. | 715/243 |
| 2015/0073922 A1 * | 3/2015 | Epperson et al. | 705/14.73 |
| 2015/0082159 A1 | 3/2015 | DeLuca et al. | |
| 2015/0154303 A1 | 6/2015 | Shin | |
| 2015/0248423 A1 | 9/2015 | Christolini | |
| 2016/0062960 A1 | 3/2016 | Eggleston et al. | |
| 2016/0092404 A1 | 3/2016 | Farouki et al. | |
| 2016/0092405 A1 | 3/2016 | Lee et al. | |
| 2016/0092406 A1 | 3/2016 | Farouki et al. | |
| 2016/0092419 A1 | 3/2016 | Farouki et al. | |
| 2016/0092428 A1 | 3/2016 | Ilic et al. | |
| 2016/0093080 A1 | 3/2016 | Tumanov et al. | |

FOREIGN PATENT DOCUMENTS

| | | |
|---|---|---|
| KR | WO2014069755 | 5/2014 |
| WO | WO 01/50349 A1 | 7/2001 |
| WO | 2013051218 A1 | 4/2013 |
| WO | WO2013051218 | 4/2013 |
| WO | WO2014/015081 A2 | 1/2014 |
| WO | 2014069755 A1 | 5/2014 |

OTHER PUBLICATIONS

"All Things Seen and Unseen", Published on: Dec. 2012, Available at: http://rmarsh.com/plugins/similar-posts/, 63pp.

"Editorial Assistant by Zemanta", Published on: May 20, 2013, Available at: https://wordpress.org/plugins/zemanta/, 5pp.

"How do I p+A68reserve legibility when overlaying text on images?", Published on: Jun. 30, 2014, Available at: http://graphicdesign.stackexchange.com/questions/4561/how-do-i-preserve-legibility-when-overlaying-text-on-images, 1pp.

"Related Entries", Published on: Sep. 2, 2011, Available at: http://wasabi.pbworks.com/w/page/5264043/Related%20Entries, 1 pp.

"Split-screen User Interface", Published on: Oct. 30, 2012, Available at: http://www.uscellular.com/uscellular/pdf/samsung-note-2-split-screen.pdf, 1pp.

"Techniques for WCAG 2.0", Published on: May 17, 2007, Available at: http://www.w3.org/TR/2007/WD-WCAG20-TECHS-20070517/Overview.html#G18 , 229pp.

"Text over a picture: How to Make it Readable", Published on: May 3, 2012, Available at: http://www.well-made-webs.com/visual-marketing/text-work/text-over-images/, 5pp.

"YARPP Basic vs. Pro? Why choose?", Published on: Dec. 26, 2013, Available at: http://www.yarpp.com/, 2pp.

Baumann, Alex, "Machine Learning for User Interfaces", Published on: Aug. 28, 2014, Available at: http://www.cs.uml.edu/~abaumann/HCI/HCI_-_Final_Paper-Machine_Learning.pdf, 8pp.

Eisenstein et al., "Adaptation in Automated User-Interface Design", Jan. 9, 2000, *Proceedings of the 5th International Conference on Intelligent User Interfaces*, 8pp.

Francisco-Revilla et al., "Interpreting the Layout of Web Pages", Jun. 29, 2009, *Proceedings of the 20th ACM Conference on Hypertext and Hypermedia*, 10pp.

Gajos et al., "Preference Elicitation for Interface Optimization", Oct. 23, 2005, Proceedings of the 18th Annual ACM Symposium on User Interface Software and Technology, 10pp.

Gajos, Krzysztof Z., "Automatically Generating Personalized User Interfaces", Jun. 20, 2010, Dissertation of Doctor of Philosophy, Univ. of Washington, 210pp.

(56) References Cited

OTHER PUBLICATIONS

Geigel et al., "Automatic Page Layout Using Genetic Algorithms for Electronic Albuming", Jan. 2001, *Proceedings of Electronic Imaging*, 12pp.

Hasegawa et al., "Recommendation and Diagnosis Services for Presentation Semantics", Nov. 29, 2010, *Proceedings of the 18th International Conference on Computers in Education*, pp. 285-289.

Leykin et al., "Automatic determination of text readability over textured backgrounds for augmented reality systems", Nov. 2, 2004, *Proceedings of the Third IEEE and ACM International Symposium on Mixed and Augmented Reality*, 7pp.

Lumley, John., "Functional, Extensible, SVG-based Variable Documents", Sep. 10, 2013, *Proceedings of the 2013 ACM symposium on Document engineering*, pp. 131-140.

Malerba et al., "Correcting the document layout: a machine learning approach", Aug. 3, 2003, *Proceedings of the Seventh International Conference on Document Analysis and Recognition*, 6pp.

Malu et al., "An Approach to Optimal Text Placement on Images", Jul. 21, 2013, *10th International Conference*, EPCE 2013, Held as Part of HCI International, 7pp.

Martin et al., "Automatic Multimedia Creation Enriched with Dynamic Conceptual Data", Dec. 2012, *International Journal of Artificial Intelligence and Interactive Multimedia*, vol. 1, No. 7, 2pp.

Parker, Jeff., "Yet Another Related Posts Plugin (YARPP)", Published on: Dec. 2009, Available at: http://wordpress.org/plugins/yet-another-related-posts-plugin/, 3pp.

Suh et al., "Automatic Thumbnail Cropping and its Effectiveness", Nov. 2, 2003, *Proceedings of the 16th annual ACM symposium on User interface software and technology*, 10pp.

Wade et al., "Ontology Add-in for Word", Published on: Apr. 24, 2011, Available at: http://research.microsoft.com/en-us/projects/ontology/, 1pp.

Liu, et al., "Optimizing Photo Composition", Computer Graphics Forum, 2010, vol. 29 (2), pp. 469-478.

Search Report & Written Opinion dated Jan. 11, 2016 in PCT Application No. PCT/US2015/052765.

Search Report & Written Opinion dated Dec. 23, 2015 in PCT Application No. PCT/US2015/052538.

Zhang et al., "Auto Cropping for Digital Photographs", IEEE International Conference on Multimedia and Expo, 2005, 4 pages.

Bloechle, et al., "OCD Dolores—Recovering Logical Structures for Dummies", 10th IAPR International Workshop on Document Analysis Systems (DAS), IEEE, 2012, pp. 245-249.

Chen, et al., "A survey of document image classification: problem statement, classifier architecture and performance evaluation", International Journal of Document Analysis and Recognition (IJDAR), Berlin, Germany, vol. 10, No. 1, Springer, 2006, pp. 1-16.

Fitzpatrick, Jason , "Fillerati Generates Dummy Text from Classic Literary Works", Retrieved from ttp://web.archive.org/web/20140527042603/http:// lifehacker.com/5656091/fillerati -generates -dummy -text -from -classic-literary-works>>, May 27, 2014, 3 Pages.

Flynn, "Document Classification in Support of Automated Metadata Extraction from Heterogenous Collections", retrieved on Feb. 17, 2016 at <<http://www.cs.odu.edu/~pflynn/dissertation/flynn-thesis-9apr2014.pdf>>, Thesis Submitted to the Faculty of Old Dominion University, 2014, pp. i-187.

International Search Report and Written Opinion Issued in PCT Application No. PCT/US2015/052763, a foreign counter application to U.S. Appl. No. 14/503,188, mailed on Mar. 1, 2016, 13 pages.

"Loducca: Twipsum", Retrieved from <<http://adsoftheworld.com/media/online/loduccaiwipsum>>, Sep. 1, 2011, 2 Pages.

"Fillerama", Retrieved from <http://web.archive.org/web/20140701213636/ http://www.macdrifter.com/2011/11/fillerama-link.html>>, Jul. 1, 2014, 4 Pages.

Mao, et al., "Document Structure Analysis Algorithms: A Literature Survey", Optomechatronic Micro/Nano Devices and Components III, Proceedings of SPIE, vol. 5010, SPIE, Bellingham, WA, 2003, pp. 197-207.

Office Action for U.S. Appl. No. 14/503,211, mailed on May 18, 2016, David Benjamin Lee, "Intent Based Authoring", 18 pages.

Office action for U.S. Appl. No. 14/503,216, mailed on May 6, 2016, Farouki et al., "Inferring Layout Intent", 14 pages.

Office action for U.S. Appl. No. 14/503,207, mailed on May 6, 2016, Tumanov et al., "Optimizing the Legibility of Displayed Text", 22 pages.

PCT Search Report and Written Opinion mailed Feb. 25, 2016 for PCT Application No. PCT/US2015/052539, 17 pages.

PCT Search Report and Written Opinion mailed Feb. 26, 2016 for PCT Application No. PCT/US2015/052764, 14 pages.

PCT Search & Written Opinion for Application No. for PCT/US2015/052765, mailed on Jan. 11, 2016, a counterpart foreign applictaion of U.S. Appl. No. 14/503,199, 11 pages.

PCT Search & Written Opinion for Application No. for PCT/US2015/052758, mailed on Jan. 25, 2016, a counterpart foreign applictaion of U.S. Appl. No. 14/503,211, 11 pages.

Tao, et al., "Contextual modeling for logical labeling of PDF documents", Computers and Electrical Engineering, vol. 40, No. 4, 2014 pp. 1363-1375.

PCT Written Opinion of the International Preliminary Examining Authority mailed Aug. 23, 2016 for PCT application No. PCT/US2015/052764, 7 pages.

PCT Written Opinion of the International Preliminary Examining Authority mailed Aug. 26, 2016 for PCT Application No. PCT/US15/52765, 6 pages.

PCT Written Opinion of the International Preliminary Examining Authority mailed Aug. 26, 2016 for PCT Application No. PCT/US15/52763, 7 pages.

PCT Written Opinion of the International Preliminary Examining Authority mailed Aug. 29, 2016 for PCT Application No. PCT/US15/52758, 7 pages.

PCT Written Opinion of the International Preliminary Examining Authority for PCT application No. PCT/US2015/052539, dated Aug. 26, 2016, 12 pages.

"International Search Report & Written Opinion Issued in PCT Application No. PCT/US2015/052540", Mailed Date: Jan. 21, 2016, 12 Pages.

"Second Written Opinion Issued in PCT Application No. PCT/US2015/052540", Mailed Date: Aug. 10, 2016, 6 Pages.

Written Opinion Issued in PCT Application No. PCT/US2015/052538, Mailed Date: Aug. 31, 2016, 6 Pages.

U.S. Appl. No. 14/503,188—Non Final Office Action mailed Oct. 4, 2016, 15 pages.

U.S. Appl. No. 14/503,216—Non Final Office Action mailed Sep. 26, 2016, 19 pages.

Shumeet Baluja, "Browsing on Small Screens: Recasting Web-page Segmentation into an Efficient Machine Learning Framework", May 2006.

Sano, et al., "A Web Page Segmentation Method based on page Layouts and Title Books"; IJCSNS International Journal of Computer Science and Network Security, vol. 11 No. 10, pp. 84-90, Published Oct. 2011.

U.S. Appl. No. 14/503,199—Non Final Office Action mailed Aug. 11, 2016, 12 pages.

U.S. Appl. No. 14/503,207—Final Office Action mailed Oct. 24, 2016, 46 pages.

U.S. Appl. No. 14/503,174, Non Final Office Action mailed Oct. 18, 2016, 42 pages.

PCT/US2015/052758—International Preliminary Report on Patentability, mailed Dec. 20, 2016, 16 pages.

PCT/US2015/052765—International Preliminary Report on Patentability, mailed Nov. 28, 2016, 13 pages.

PCT/US2015/052540—International Preliminary Report on Patentability, mailed Dec. 13, 2016, 16 pages.

PCT/US2015/052763—International Preliminary Report on Patentability, mailed Dec. 8, 2016, 16 pages.

PCT/US2015/052764—International Preliminary Report on Patentability, mailed Nov. 28, 2016, 15 pages.

(56) References Cited

OTHER PUBLICATIONS

Jason Fitzpatrick, "Fillerati Generates Dummy Text from Classic Literary Works", May 27, 2014.
International Preliminary Report on Patentability Issued in PCT Application No. PCT/US2015/052539, Mailed Date: Dec. 8, 2016, 11 Pages.
International Preliminary Report on Patentability Issued in PCT Application No. PCT/US2015/052538, Mailed Date: Dec. 16, 2016, 6 Pages.
Corrected International Preliminary Report on Patentability Issued in PCT Application No. PCT/US2015/052758, Mailed Date: Jan. 18, 2017, 8 Pages.

* cited by examiner

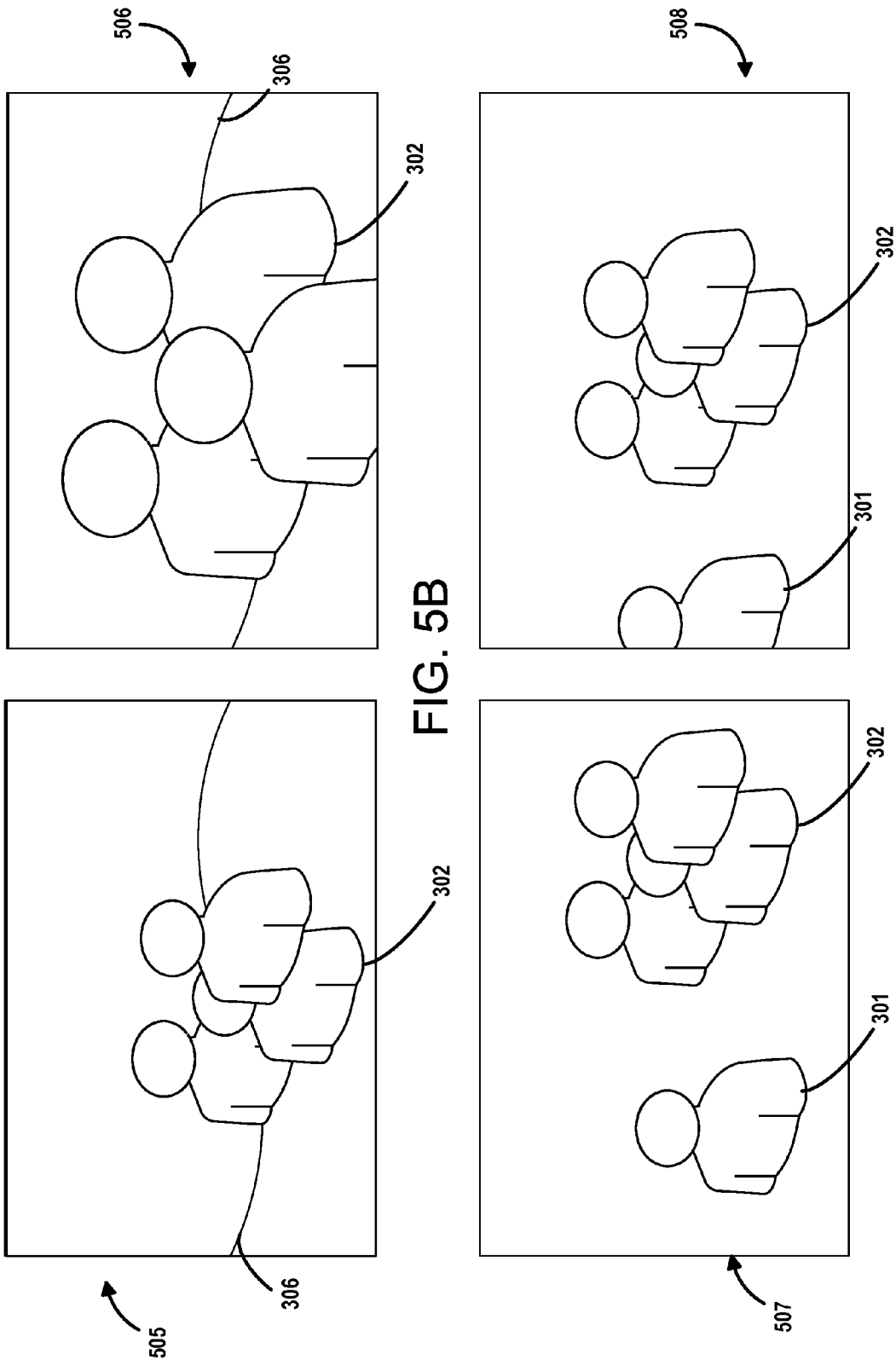

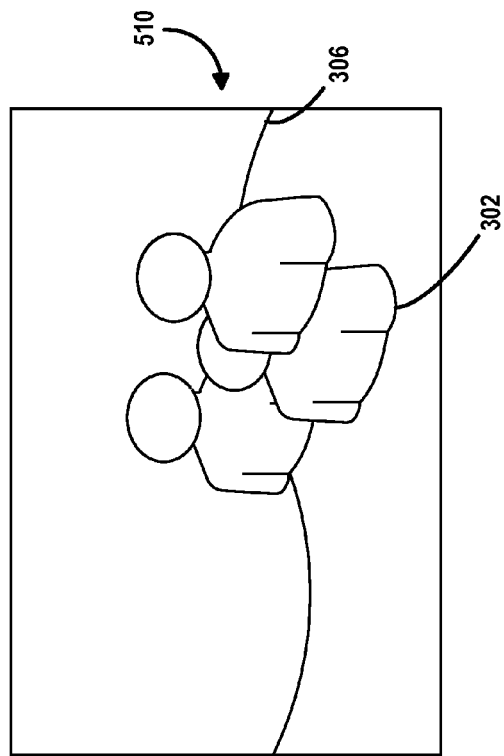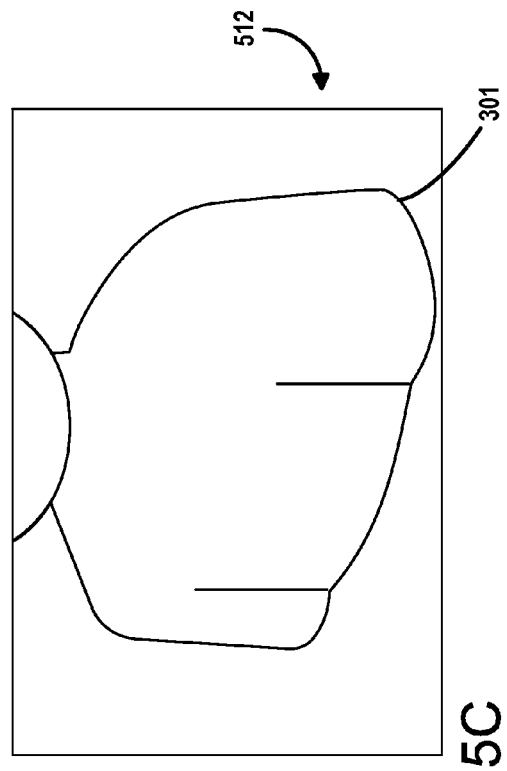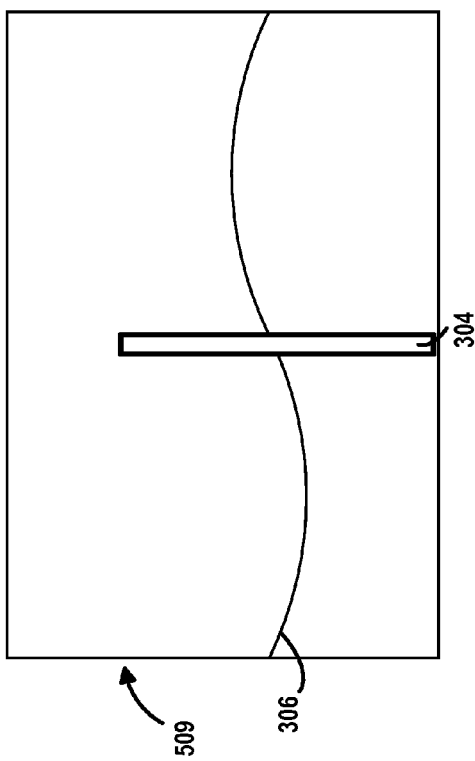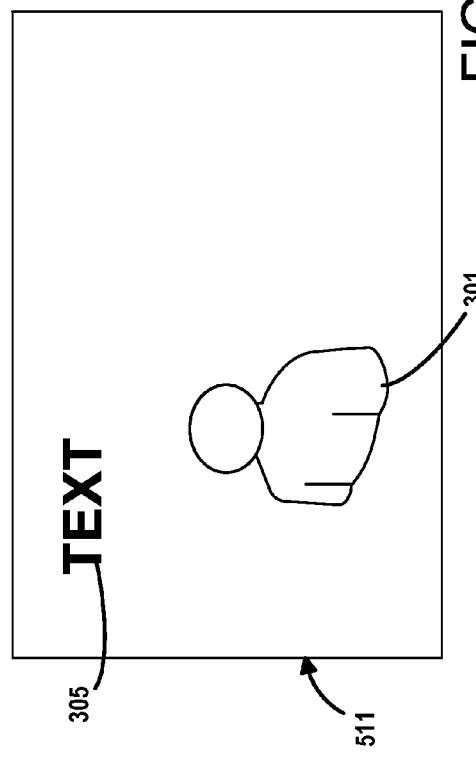
FIG. 5C

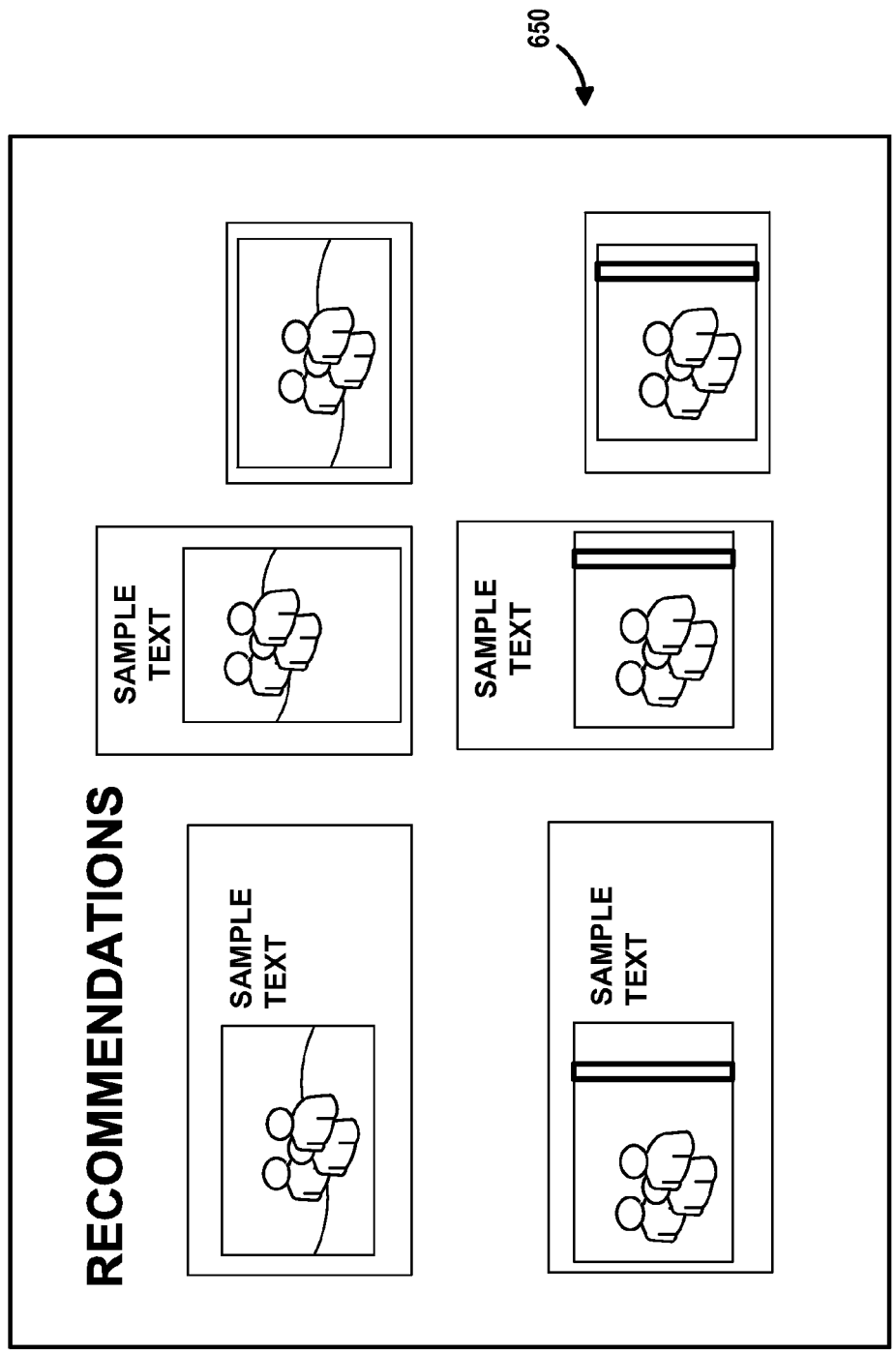

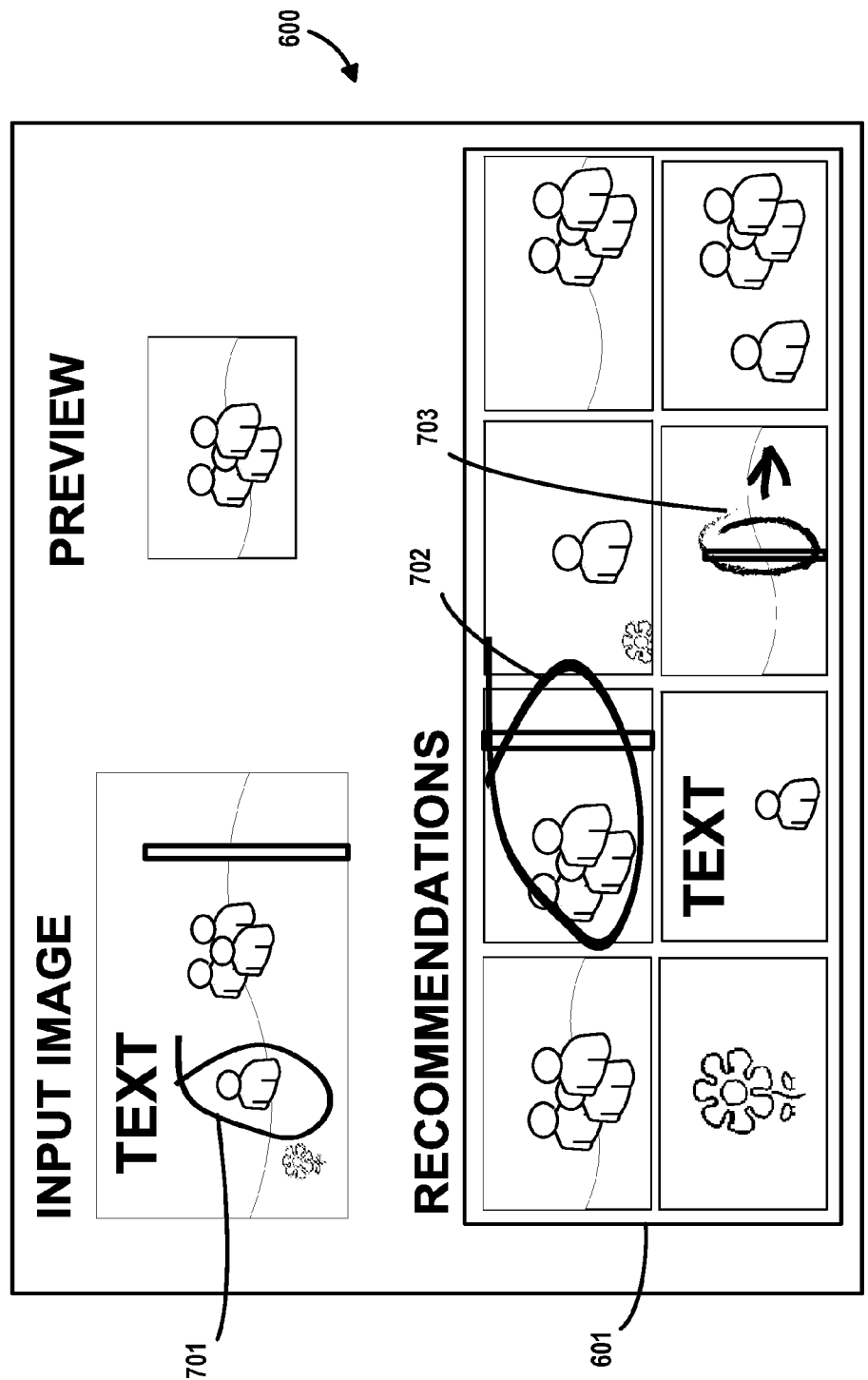

OPTIMIZING A VISUAL PERSPECTIVE OF MEDIA

BACKGROUND

The availability and diversity of software that can be used to create content has increased. Similarly, software applications used for editing images, videos and other forms of media have contributed to advances in the sharing of rich forms of information by allowing users to supplement content with images, videos and other forms of visualizations. For instance, some software applications allow users to edit an image. When using such applications, users may be tasked with the challenge of applying edits that bring highlight to one or more features. Such tasks generally require a manual editing process, which may be inefficient and cumbersome.

Because almost any technology user today creates, generates, shares, and/or publishes content, some users or other entities creating, generating, sharing, or publishing the content may not be trained in design principles. As a result, some users may not be capable of editing media to optimize the visual effectiveness of the content. Regardless of the level of training, it may be even more difficult to produce visual content that brings focus to the elements of an image while also improving the aesthetics. In addition, the wide range of available devices on which content is consumed such as smartphones, tablets, laptops, desktop and large screens further complicates content creation. It may not be feasible even for a capable author to create content optimized for all the form factors, screen sizes and resolutions.

It is with respect to these and other considerations that the disclosure made herein is presented.

SUMMARY

Technologies are described herein for optimizing a visual perspective of media. Generally described, one or more signals may be used to identify regions of interest of an image. The signals are applied to the image to generate one or more models that bring focus to one or more regions of interest. For instance, the models may present different perspectives of the image by emphasizing various features and focal points of one or more regions of interest. The models may be ranked, filtered and displayed according to a scoring paradigm that is based on one or more scoring signals. Techniques disclosed herein also provide a multi-tier feedback paradigm that receives and interprets different types of feedback associated with the models. For example, techniques disclosed herein process user feedback to interpret "user intent" and/or other forms of gestures. Feedback associated with the models may be used to generate additional models that are based on one or more signals that modify one or more aspects of an image. The feedback may also be stored and utilized for machine learning purposes.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A-5C illustrate a number of sample representations of several sample models.

FIGS. 6A-6B illustrates example interfaces that may be used to display one or more models.

FIGS. 7A-7E illustrates example interfaces that may be used to display one or more models and receive multiple types of feedback.

DETAILED DESCRIPTION

Figure 1:
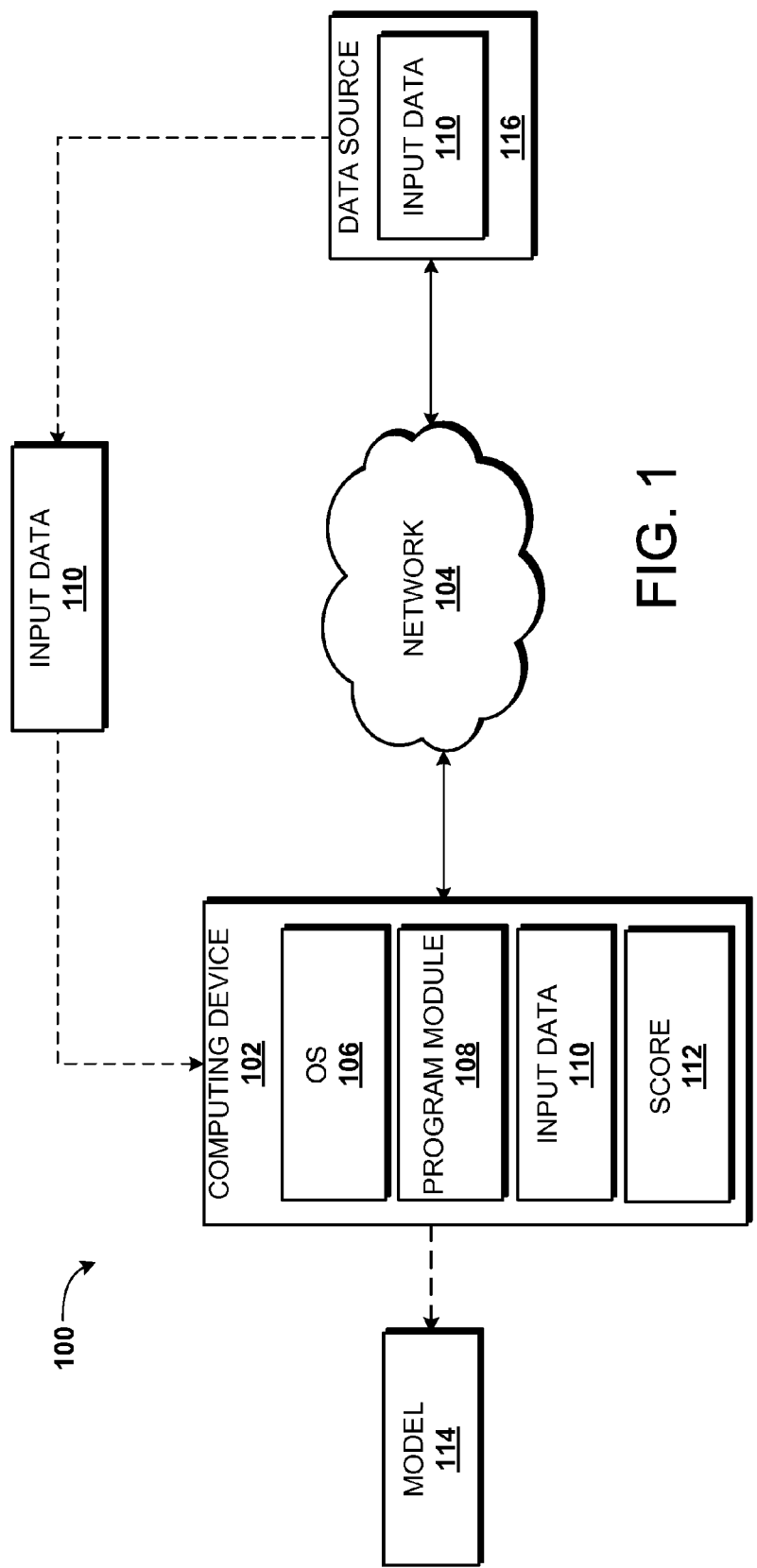
FIG. 1 is a block diagram showing several example components of a system for optimizing a visual perspective of media.

Technologies are described herein for optimizing a visual perspective of media. Generally described, one or more signals may be used to identify regions of interest within an image. The signals are applied to the image to generate one or more models that bring focus to one or more regions of interest. For instance, the models may define one or more perspectives of the image by emphasizing various features and focal points of one or more regions of interest. The models may be ranked, filtered and displayed according to a scoring paradigm that is based on one or more scoring signals. Multi-tiered feedback mechanisms allow for the collection of various forms of input, including user intent and other forms of explicit instructions that may be interpreted from various forms of input gestures. Feedback associated with the models may be obtained and used to generate additional models that are based upon one or more signals. The feedback may also be stored and utilized for machine learning purposes.

For illustrative purposes, the term "signal" refers to a source of information, process or any data that may be used to identify and process a region of interest of an image or other form of media. For illustrative purposes, a "region of interest" may also be referred to herein as a "region." In some non-limiting examples, a signal may include data or a process related to the identification and processing of salient regions or invariant regions in an image. In another example, a signal may include data or a process related to the capabilities of a device. This type of signal may include data describing an aspect ratio, resolution, physical dimensions and/or other information describing a device. In other examples, a signal may include data or a process related to the identification and processing of specific elements, people, objects or features of an image. For instance, a signal may be used to identify a face, person, body, a strong line or any other object or element in an image. For illustrative purposes, a "subject" of an image may include any feature, object, any part of an object, a person, or any part of a person.

In other non-limiting examples, a signal may include data or a process related to an intended use for the image. This type of signal may define a viewport having a target area used to display one or more images. The viewport may include any arrangement or layout of displayable media, which may include multiple target areas and/or other information such as descriptive text.

In yet another example, a signal may include data or a process indicating or defining a user preference. For instance, one or more signals may indicate a preference for images having one or more features or images that follow one or more photography principles. For example, a signal may define one or more rules indicating that it is favorable to follow the Rule of Thirds, which is a known principle where an object of an image should be positioned at a specific proportion, e.g., ⅓, of at least one dimension of the image. In another example, a signal may define one or more rules indicating that it is favorable to allocate space in front of a person depicted in the image. In yet another example, a signal may define one or more rules indicating that it is not favorable to crop, cover or otherwise obscure a subject or text in an image. As will be described below, signals indicating such preferences may be used to generate a model that may optimize a visual perspective and/or the aesthetics of an image.

These example signals are provided for illustrative purposes and are not to be construed as limiting. As it can be appreciated, any information, paradigm, process or data structure from any resource may be used with techniques described herein to identify and process a region of interest in any form of media. In addition, although the techniques described herein refer to the processing of images, it is to be appreciated that an "image" may be a part of any form of media, such as a video, still image, or another form of media describing a two-dimensional ("2D") or three-dimensional ("3D") display environment. For instance, an image may be a still image, part of a video, or one or more perspectives of a 2D or 3D display environment.

As will be described in more detail below, one or more signals may be utilized to generate a model that defines one or more modifications and/or viewing parameters of an image. The model may define one or more perspectives of the image by emphasizing various features and focal points of one or more regions of interest. For instance, a model may focus on a particular element, such as a strong line, or a model may focus on a combination of elements, such as a strong line and a face. In one example, a model may define cropping coordinates of an image to bring focus to one or more regions of interest. As will be described below, a number of models having a different focus depending on the applied signals are generated and scored according to one or more factors. The models are then filtered, ranked and presented in an interface for selection.

Multi-tiered feedback mechanisms allow for the collection of various forms of input. In one form, input data may indicate a selection of a model. The input data may also indicate an intent that may be interpreted to bring priority or focus to one or more regions of an image. In addition, the input data may include explicit instructions defining one or more viewing parameters of the input image and/or modifications to the input image. Additional details regarding these features and other features are provided in more detail below.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for optimizing a visual perspective of media. As will be described in more detail below with respect to FIGS. 8-10, there are a number of applications and services that can embody the functionality and techniques described herein.

Referring now to FIG. 1, aspects of one operating environment 100 for the various configurations presented herein will be described. The operating environment 100 shown in FIG. 1 can include a computing device 102. According to various configurations, the functionality of the computing device 102 can be provided by a personal computer ("PC") such as a desktop, tablet, workstation, or laptop computer system. The functionality of the computing device 102 also can be provided by other types of computing systems including, but not limited to, server computers, handheld computers, netbook computers, notebook computers, embedded computer systems, personal digital assistants, mobile telephones, tablet or slate computers, smart phones, or other devices or systems capable of executing the various software elements described herein. Because other computing systems can be used to provide the functionality described herein, the above examples of the computing device 102 should be understood as being illustrative and should not be construed as being limiting in any way.

According to some configurations, the computing device 102 is configured to operate in communication with, or as a part of, a communications network ("network") 104. In some other configurations, the computing device 102 does not operate in communication with the network 104 and/or functionality of the computing device 102 described herein can be provided without accessing the network 104. The computing device 102 can be configured to execute an operating system 106 and one or more application programs, modules, software elements, or other computer-executable or computer-executable instructions such as, for example, a program module 108 and/or other computer-executable instructions.

The operating system 106 is a computer program for controlling the operation of the computing device 102. The program module 108 can include an executable program configured to execute on top of the operating system 106 to provide the functionality described herein for optimizing a visual perspective of media. Although the program module 108 is illustrated as a component of the computing device 102, it should be understood that the program module 108 might be embodied as or in a stand-alone device or components thereof operating as part of or in communication with the network 104 and/or the computing device 102. The program module 108 also can be a virtualized service or technology layer that executes on the computing device 102 and/or on other real or virtual devices in communication with the computing device 102. Thus, the configuration shown in FIG. 1 is illustrative and should not be construed as being limiting in any way.

As will be explained in more detail below, the program module 108 can be configured to obtain input data 110. The input data 110 obtained by the program module 108 can include visual content such as one or more images, videos, or the like. As can be appreciated, the input data 110 may also include data that defines 3D models, which may include maps, virtual environments, and/or multi-dimensional objects. For purposes of illustrating and describing the concepts and technologies disclosed herein, the visual content is referred to herein as "images."

Text and other graphical objects that are positioned over, or overlaid on, one or more images, may be defined by the input data 110 in any suitable format. For instance, the text and other graphical objects may be defined by data describing information such as a font, point size, text position, layout or other information used to describe text, symbols and/or markings that are to be positioned over one or more images. Because there are a number of types of visual content that are contemplated and are possible, it should be understood that the described implementations are illustrative and should not be construed as being limiting in any way.

The input data 110 may also include data related to an "intended use" for the input data 110. The intended use may include any type of information describing how the media, such as an image, of the input data 110 may be utilized. In some configurations, the intended use may define one or more viewing distances depending on the size of one or more display devices. In such configurations, data defining the intended use may accommodate a phone with a small screen, a desktop with a larger screen or even a projector with yet a larger screen. In one illustrative example, data defining the intended use may have one range of viewing distances for interesting features of an image when the image is displayed on a phone, and at the same time the data defining the intended use may provide a broader viewing distance of the features when the image is displayed on a larger display device. Having multiple levels of viewing distances for different display devices allows users to view details and see the author's intent regardless of the screen size.

In other examples, an intended use may include the use of an image in a start menu tile. In yet another example, an intended use may include the display of an image in a defined layout of a web page. In some configurations, for example, an intended use may include layout information, one or more aspect ratios, and other information such as text or symbols that may be displayed with the image. It can be appreciated that data describing an intended use may be obtained in the input data 110. In addition, data describing an intended use may be stored or accessed from a local or remote configuration file or it may be built into an application. Other aspects and illustrative examples of an intended use are described in more detail below.

According to various configurations, the computing device 102 can be configured to obtain, create, generate, receive, and/or store the input data 110. For example, the input data 110 can be stored at the computing device 102 in a memory, disk drive, or other data storage elements. In some other configurations such as the configuration illustrated in FIG. 1, the input data 110 can be obtained from a data source 116 that can be configured to operate as part of or in communication with the network 104. The functionality of the data source 116 can be provided by a network drive, a server computer operating on or in communication with the network 104, a database or other real or virtual data storage elements, and/or other data storage devices.

As described in detail below, the input data 110 or other data obtained by the computing device 102 may be processed to identify and analyze regions of interest of an image contained in the input data 110. The signals are applied to the image to generate one or more models that brings focus to one or more regions of interest. For instance, the models may present different perspectives of the image by emphasizing various features and focal points of one or more regions of interest. The models may be ranked, filtered and displayed according to a scoring paradigm that is based on one or more scoring signals. As will be described in more detail below, a score 112, also referred to herein as a signal score, may be calculated depending on a success rating for the one or more signals that are applied to the image.

Figure 2:
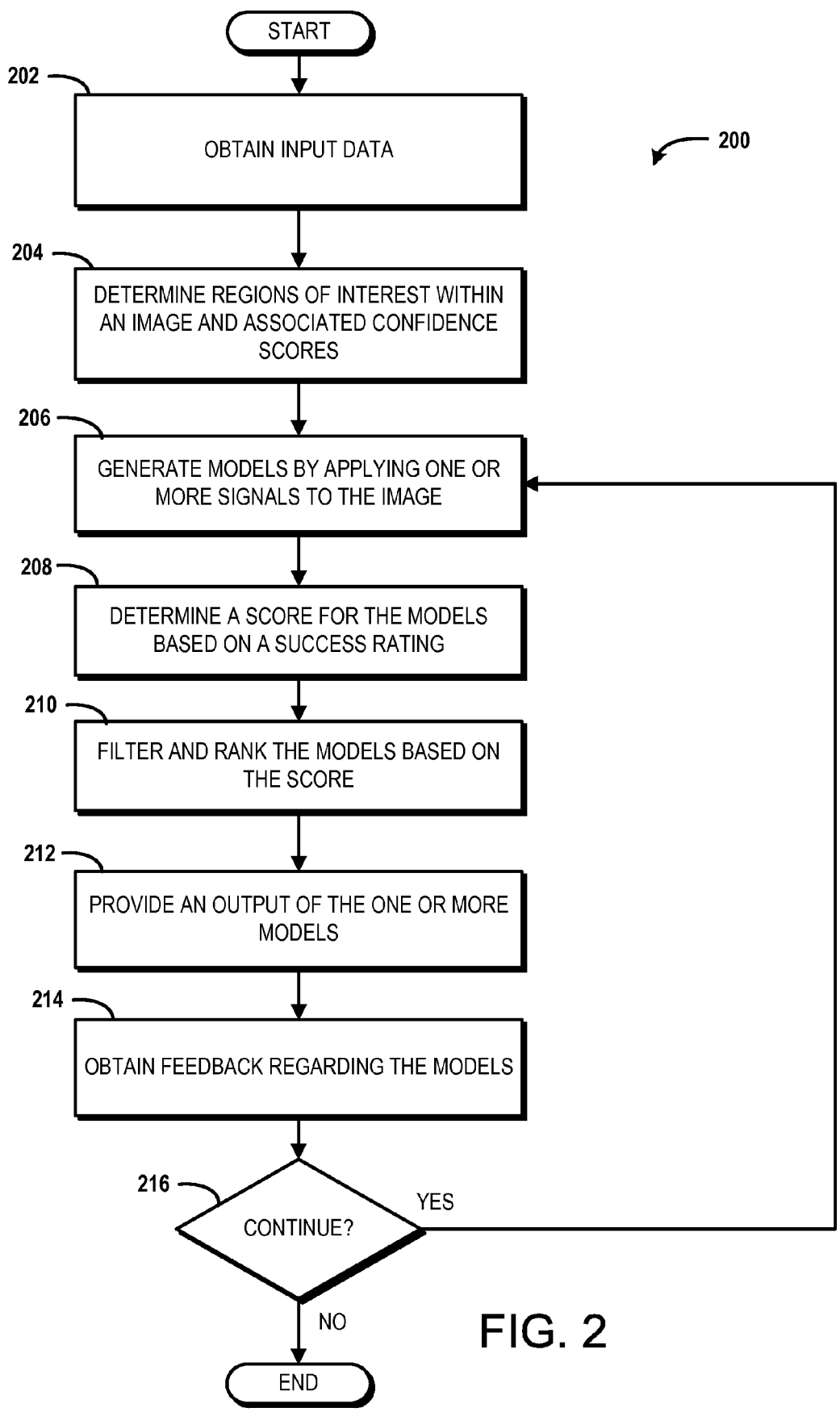
FIG. 2 is a flow diagram illustrating aspects of a method for optimizing a visual perspective of media.

Turning now to FIG. 2, aspects of a routine 200 for optimizing a visual perspective of media are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIGS. 8-10, the operations of the routine 200 are described herein as being implemented, at least in part, by an application, such as the program module 108. Although the following illustration refers to the program module 108, it can be appreciated that the operations of the routine 200 may be also implemented in many other ways. For example, the routine 200 may be implemented by, at least in part, a content creation application 813 of FIG. 8 or any other application, such as a web browser application 810 of FIG. 8. In addition, one or more of the operations of the routine 200 may alternatively or additionally be implemented, at least in part, by a web browser application 810 of FIG. 8 or another application working in conjunction with one or more servers, such as one or more an application servers 908 of FIG. 9.

With reference to FIG. 2, the routine 200 begins at operation 202, where the program module 108 obtains input data 110. As summarized above, the input data 110 may define an approach, model or theme for presenting text in a 2D or a 3D display environment. For example, the input data 110 may include an image, part of a video, or one or more perspectives of a 2D or 3D display environment, data modeling an augmented reality environment and/or combinations thereof. For illustrative purposes, some examples described herein involve the processing of image data or the processing of an "image." It can be appreciated that such examples are provided for illustrative purposes and techniques disclosed herein may be applied to any other form of data that involves the display of text with any form of media. As described in detail below, the input data 110 may also include data associated with an intended use.

Figure 3A:
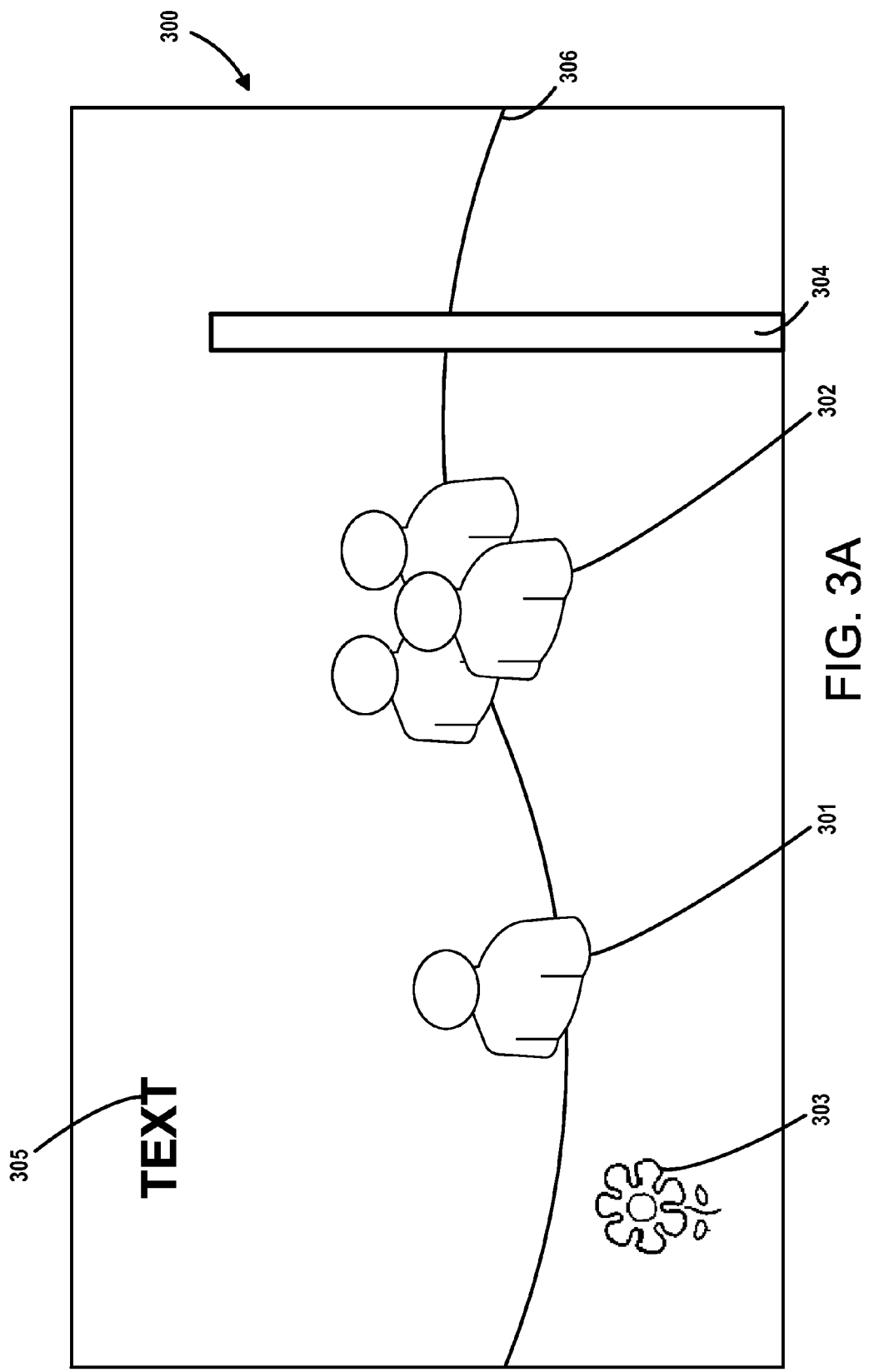
FIG. 3A illustrates a rendering of an example image used to illustrate aspects disclosed herein.

Referring briefly to FIG. 3A, an illustration of one example rendering of an image 300 is shown and described. The image 300 includes a number of objects and features. In this example, the image 300 includes a person 301, a group of people 302, a flower 303, a horizon line 306 and a sculpture 304. The image 300 also contains text 305, which may be embedded in the image data. This example is provided for illustrative purposes and is not to be construed as limiting. It can be appreciated that the input data 110 may include any form of media, including 2D and 3D models defining one or more environments, videos or images.

The input data 110 may also include data associated with an intended use. Generally described, an intended use may include any type of information describing how media of the input data 110, such as an image, may be utilized. Data related to an intended use may include layout information, text that may be presented with an image, one or more aspect ratios and/or other information describing display parameters. It can be appreciated that the data related to an intended use may be obtained with the image or as a stand-alone input. It can be appreciated that the data associated with an intended use may be obtained with data defining the image. It can also be appreciated that the data associated with an intended use may be obtained separately from the data defining the image. For instance, the data associated with an intended use may be stored as a part of the program module 108, in a configuration file, and/or in another local or remote module.

Figure 3B:
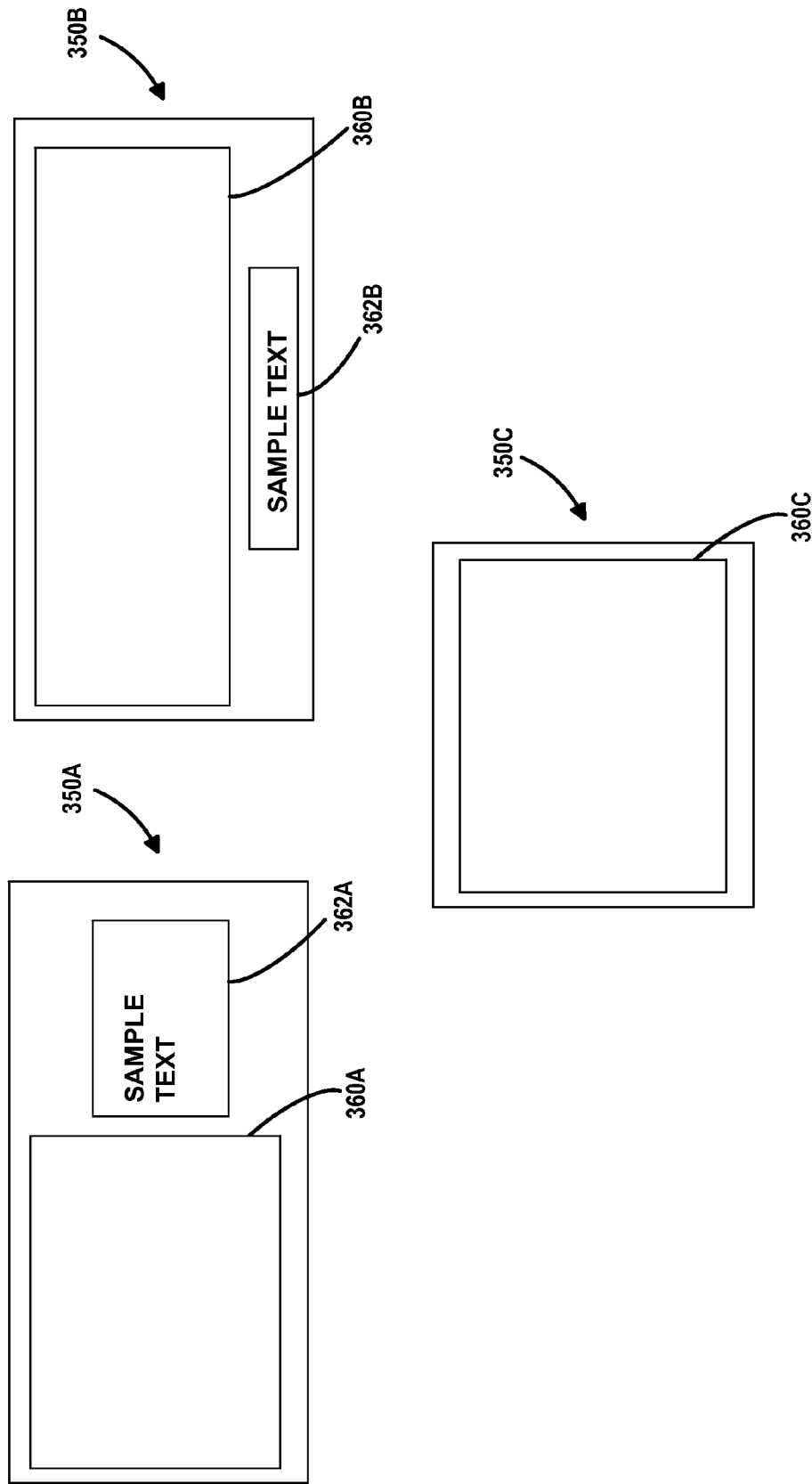
FIG. 3B illustrates examples of three viewports used to illustrate aspects disclosed herein.

For illustrative purposes, FIG. 3B provides illustrative examples of three viewports 350A-350C (also referred to generically as "viewports 350") that may be used to convey an intended use. As shown, the viewports 350 may be configured with different shapes and sizes and combinations of various elements. For instance, as shown in FIG. 3B, a first example viewport 350A includes a focus area 360A and a text field 362A. The focus area 360A may be a designated area for one or more images, such as the image 300. In this example, the first example viewport 350A includes a layout where the focus area 360A is positioned next to the text field 362A. In some configurations, the data defining the viewport 350A may include a number of parameters, such as dimensions and/or an aspect ratio associated with the focus area 360A. One or more viewports and associated information can be created in number of ways. In some implementations, a person skilled in the graphical design may manually define the viewport size, placement of text, location of focus areas and other parameters needed to produce intended output. In other implementations, automatic layout systems, which are not described here, may be used to produce one or more viewports and associated data based on a desired layout. In yet other implementations, a viewport size can be based on a device which may display the output. For example, the viewport size may match the screen size or a preset portion of screen size of one or more devices. Additional parameters can also be inferred by the system and/or defaults may be used.

As also shown in FIG. 3B, a second example viewport 350B includes a focus area 360B positioned above the text field 362B. As shown, the focus area 360B and the text field 362B are centered in the viewport 350B. As can be appreciated, data defining the second example viewport 350B may define an aspect ratio for the focus area 360B, which in this example, has different parameters than the first example viewport 350A. Data describing a viewport (also referred to herein as "viewport data") may come from a number of sources. For example, viewport data may be generated by a layout engine that analyzes various factors to determine an optimal layout for images and text. Viewport data may be based on capabilities of one or more devices. Viewport data may be, at least in part, based on one or more configuration files and/or the manual entry of data by a user.

FIG. 3B also shows a third example viewport 350C that includes a focus area 360C without a text field. It can be appreciate that these examples are provided for illustrative purposes only as any type of data defining an intended use may be used with techniques disclosed herein. As will be described below, data describing an intended use, which may be in the form of a layout for the image, will be used in one or more techniques for optimizing a visual perspective of media.

Returning to FIG. 2, at operation 204, the program module 108 identifies at least one region on interest within the image 300. In general, a region of interest may be any portion, section or area of an image that may contain an object or feature. A region of interest may be identified by the use of a number of techniques. In some configurations, one or more signals may be used to analyze the image 300 to identify or determine a region of interest. For instance, a signal may be used to identify a salient region or an invariant region. In addition, a signal may be used to identify a face, person, body, a strong line or any other object or element in an image. These example signals are provided for illustrative purposes and are not to be construed as limiting. As it can be appreciated, any information, paradigm, process or data structure from any resource may be used with techniques described herein to identify and process a region of interest.

As will be described below, techniques disclosed herein may also aggregate two or more regions of interest to generate an aggregate region. In such techniques, for example, two or more regions of interest that are close in proximity may be combined or viewed as one object. As will be appreciated, such techniques involving the aggregation of two or more regions allow for the presentation of a large number of different perspectives of the image 300.

It can be appreciated that that a wide range of known techniques for identifying one or more regions may be used in operation 204. For example, salient regions and invariant regions may be determined by one or more known techniques. As used herein, the term "salient region" can be used to refer to a portion of an image that includes what can be considered to be an "important" portion of the image. For example, if an image includes people, the salient region can be determined to include one or more faces of the people in the image. Similarly, the salient region can be identified as buildings in architectural photos, flowers or other vividly colored items among trees, grass, or other relatively monotonously-colored backgrounds, or the like. In some configurations, the salient region can be identified by the computing device based upon patterns, color variances, sharpness or blurring, facial recognition, or other processes. In some configurations, salient regions may be defined by a user.

The term "invariant region" as used herein can be used to refer to an area, region, or portion of the image that has a relatively consistent color, color scheme, color differences, luminance, sharpness, blur, pattern, or the like, that can be determined to be a location at which text included in the data could be located with respect to the image over the invariant region, achieving reasonable and consistent contrast between the foreground text and the background image. In some examples, the invariant region can correspond to a relatively uniform portion of the image such as a blue sky in a landscape photograph, a wall or other background behind human subjects, or the like. Salient regions and invariant regions may or may not be mutually exclusive. For example, in some cases invariant regions can be contained within the salient regions or can overlap the salient regions.

Operation 204 may also involve the generation of a confidence score. A confidence score may be based on a wide range of factors. In a non-limiting list of examples, one or more factors that may influence a confidence score may include the match level to the identifying pattern, the size of an identifiable object, the depth of a color or luminance variation, the existence of identifiable features of an object, image quality and many other factors. A number of different techniques for identifying one or more regions of interest and determining corresponding confidence scores are known, thus, details of such techniques are not discussed in detail herein.

Figure 4:
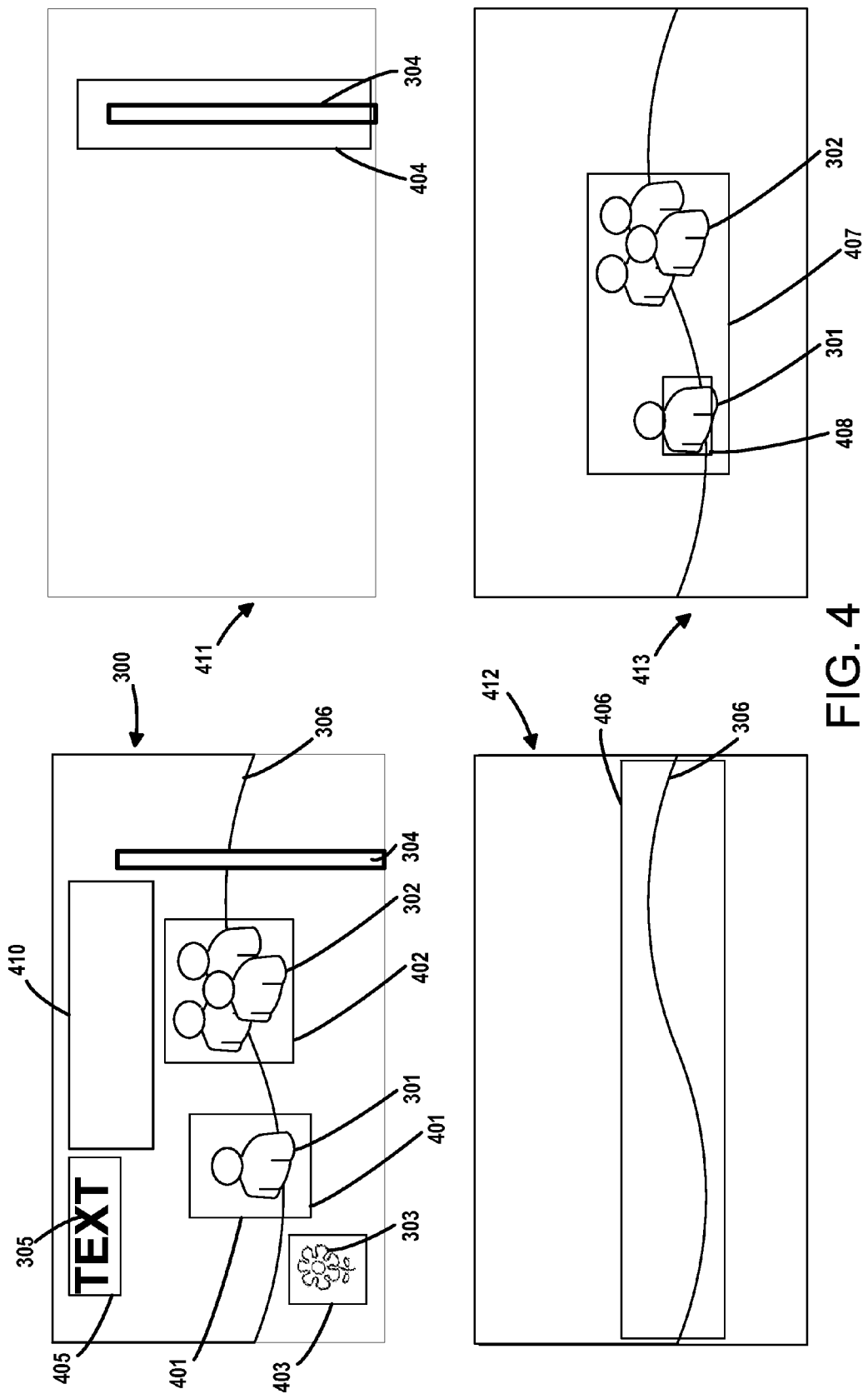
FIG. 4 illustrates examples of different regions of interest of the image shown in FIG. 3A.

To illustrate aspects of operation 204, FIG. 4 shows examples of different regions of interest 401-410. For illustrative purposes, FIG. 4 includes the image 300 and representations 410-413 of the image 300. In this particular example, a region of interest 401 is outlined around the person 301. In addition, a region of interest 402 is outlined around the group of people 302. As can be appreciated, these regions of interest may be identified by a number of different techniques, some of which may utilize one or more signals described herein. For instance, known techniques for identifying a face or a group of faces may be used to find a region of interest. In addition, other techniques for identifying salient regions may be used.

Specific to the example shown in FIG. 4, operation 204 may be used to identify a region of interest 403 outlined around the flower 303 or a region of interest 405 outlined around the text 305. In addition, known techniques may be used to identify a region of interest 410 showing an invariant region. As shown in the representation 411, known techniques for identifying strong lines may be used to identify a region of interest 404 around a structure, such as the sculpture 304. The same techniques or other techniques for identifying strong lines may be used to identify, as shown in representation 412, a region of interest 406 around the horizon 306.

It can also be appreciated that known techniques may be used to identify a region of interest for different parts of an object. For instance, although a face detection algorithm may be used to detect the person 301 and a region of interest 301 around the person 301, such algorithms or other algorithms may be used to identify a region of interest 408 around the body of the person 301. The same techniques or other techniques, for example, may be used for identifying and/or defining regions of interest around part of the sculpture 304 or part of the flower 303.

As can also be appreciated, techniques for aggregating regions of interest may be used in operation 204. For example, in the third representation 413 illustrates a region of interest 407 that is formed from aggregating the region of interest 401 around the person 301 and the region of interest 402 around the group of people 302. As can be appreciated, this example is provided for illustrative purposes as any combination of regions may be used to create an aggregate region. For instance, as will be shown in the following examples, the region of interest 407 around the group of people 302 may be combined with the region of interest in 404 around the sculpture 304. As can be appreciated, many more combinations may be identified. Additional examples, some of which include aggregated regions of interest, are described below and shown in the examples of FIGS. 5A-5C.

Returning to FIG. 2, once the program module 108 determines the regions of interest and the associated confidence scores, the routine 200 proceeds to operation 206 where the program module 108 generates one or more models 114 by applying one or more signals to the image 300. As summarized above, techniques described herein may generate a number of models that bring focus to one or more regions of interest or combinations of two or more regions of interest of an image.

In some configurations of operation 206, one or more signals may be selected for processing based on a number of factors, including a confidence score associated with one or more regions of interest. Other contextual information, such as a user preference or other data may also determine the types of signals that are applied to the image. For instance, as described below, as routine 200 is used to process images, usage data may be stored for machine learning purposes. Such usage data may be accessed in operation 206 to determine the type of signals selected for processing the image 300 into a model 114.

As also described above, individual signals or combinations of signals may be applied to an image 300 to generate a model 114. In addition, an individual region of interest or multiple regions of interest may be selected and applied to one or more signals to generate a model 114. In addition, multiple regions of interest may be aggregated and applied to one or more signals to generate a model defining a perspective of the one or more selected regions. As can be appreciated, any signal or any other process or data related to a region of interest in the image 300 may be utilized to generate a model 114 having one or more perspectives of the image 300.

Figure 5A:
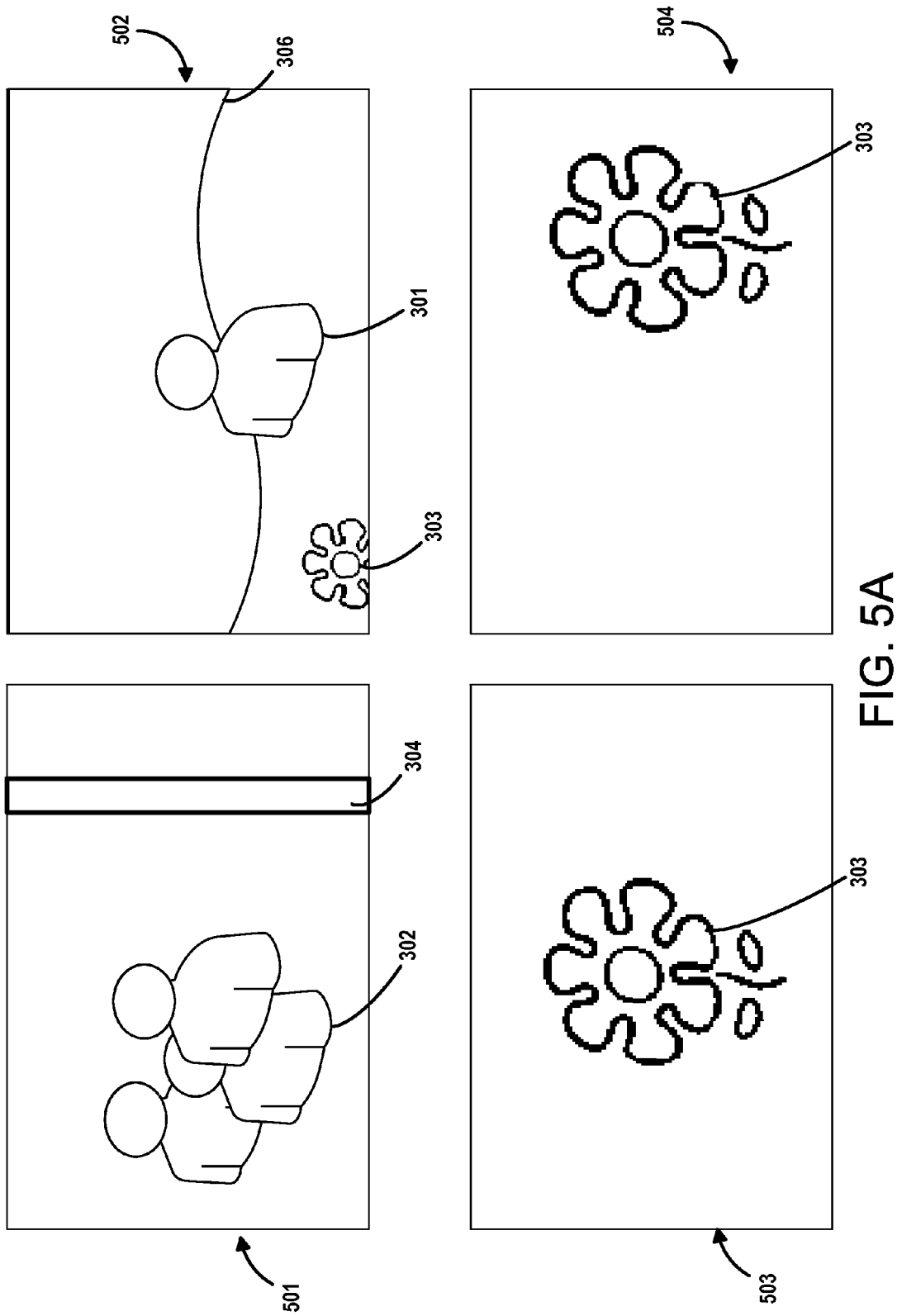

For example, any one of the regions of interest 401-410 shown in FIG. 4 may be selected and applied to one or more signals for generating a model 114. In addition, any combination of the regions of interest 401-410 shown in FIG. 4 may be selected and applied to one or more signals for generating a model 114. For example, a face recognition algorithm may determine a high confidence score associated with the region of interest 402 around the group of people 302. In such a scenario, operation 206 may generate several models 114 that focus on the group of people 302 and other objects or features around the group of people 302. FIGS. 5A-5C illustrate several renderings showing example models that may be created in this scenario.

As summarized above, a signal may include data or a process indicating a preference or an intended use. For example, data associated with an intended use may be used to determine one or more parameters of a generated model. In a specific example, as illustrated in FIG. 4 and described above, the input data 110 may contain parameters of a viewport, which may include an aspect ratio or a size of a viewing area of the image, size and location of zero or more focus areas which serve as a preferred locations for a features detected in the image, zero or more text areas to contain text to be placed over the image, data related to the intended use such as desired zoom level, etc. By allowing for adjustments in the zoom level, a viewing distance for one or more features may be modified to provide more details of the features or salient regions of an image even when the image is displayed on a small display device. In this illustrative example, data related to an intended use may cause a generated model to define a specific aspect ratio for the image.

In another example, one or more signals may indicate a preference for images having one or more features or images that follow one or more photography principles. For example, a signal may define one or more rules such as the Rule of Thirds. In another example, a signal may define one or more rules indicating that it is favorable to allocate space in front of a person depicted in the image. In yet another example, a signal may define one or more rules indicating that it is not favorable to crop text or cover text in an image. Operation 206 may process signals to generate models following one or more of the defined preferences. For instance, if an image depicts a person in the center of the image, one or more signals may crop or pan the image so there appears to be more space in front of the person. Other non-limiting examples are described below.

In some configurations, some models generated in operation 206 may also be based on one or more signals and/or regions that are selected using a random selection process. Thus, a model may focus on an object, person, part of an object or person, strong line, part of a strong line, or any other feature of the image 300. In addition, a model may focus on a salient region. In some situations, a model may focus on an invariant region. The model may focus on text displayed in an image or a combination of any object of feature of an image. Additional examples of individual signals and combinations of signals that may be used to generate a model 114 are described below and shown in FIGS. 5A-5C.

In operation 206, when one or more signals are applied to the image 300, the program module 108 may generate the model 114, which may be configured with data defining one or more perspectives of the image. For instance, to mitigate the use of computational resources, a model may include data describing cropping coordinates, color modifications, or any other data related to the image 300. For illustrative purposes, the output of operation 206 may also be referred to herein as "model data" or an "intermediate model." In addition, the model 114 may include data defining the text, such as ASCII values for the characters, a font, font size, and/or other data describing how the text may be arranged, such as the text position. As will be described below, the model 114 may be delivered with content, such as the image 300, to a consuming client where the model provides the parameters on how the image 300 may be displayed on the consuming client.

Next, at operation 208, the program module 108 determines a signal score for each model 114 generated in operation 206. Generally described, the determination of the score for each model 114 may be based on a number of factors. For example, a signal score for a particular model 114 may be based on a success rating for the one or more signals that are applied to the image 300. In a specific example, if an image includes a salient region and an invariant region, a model focusing on the salient region may score higher than a model focusing on the invariant region. In another example, a model that includes 100% of the salient region may score higher than a model that only includes 80% of the salient region. Similarly, a model that includes a face may score higher than a model that only includes a portion of the face, i.e., a cropped face may have a lower score. These examples are provided for illustrative purposes and are not to be construed as limiting, as it can be appreciated that a signal score may be influenced by any factor, event, goal, etc. For instance, with an artistic goal in mind, a close cropped face including only 90% of the face, but including both eyes, may receive a higher score than a close cropped face with 100% of the face in viewport.

In other examples, a signal score may be influence by characteristics of one or more objects depicted in a model. In particular, a signal score may be influenced by the amount of the viewing area that is filled by an object or person. For instance, in one illustrative example, a model having a face that fills 80% of the viewing area may score higher than another model having a face that fills only 20% of the viewing area. In another example, a signal score may be influenced by the amount of the focus area that is filled by an object or person, by the proximity of an object or person to the focus area or by the similarity of the aspect ratio of the focus area with the aspect ratio of the outline of an object or person. These examples are provided for illustrative purposes and are not to be construed as limiting.

In some configurations, a number of individual factors or combinations of factors may be used to influence the signal score. In some configurations, the confidence score of one or more regions may also influence the score of a particular model. For instance, if a face is recognized in an image, and the confidence score of the associated region is low, the overall signal score for the model may be lower than a comparable model involving a region with a higher confidence score.

In some configurations, signals related to various properties or characteristics of a model may influence an associated signal score. For example, a signal score of a model containing an aggregation of two or more regions of interest may be higher than a model that does not contain an aggregation of two or more regions of interest. In one illustrative example, if an image contains three regions, each of which are associated with a person, techniques disclosed herein may combine the three regions to create an aggregate region of interest. In such a scenario, the signal score for the model having the aggregated regions may be higher than a signal score of a model defining the three individual regions.

In some configurations, the location and/or size of the text placed within a viewport may influence an associated signal score. For example, a signal score of a model containing text placed over an invariant region may be higher than a signal score of a model containing text placed over a face or a salient region. Additionally, in other configurations, text legibility may be determined for particular text location and corresponding portion of the image behind the text. Text that is highly legible may result in a higher signal score while illegible text may result in a lower signal score.

Once the signal scores are determined, at operation 210, the program module 108 may filter the models based on the signal score. In some configurations, models having a signal score that meets a pre-determined threshold may be marked for use. As will be described below, models that are marked for use may be presented to a user or communicated as an output. For illustrative purposes, models that are selected for presentation may be referred to herein as "candidates." Any paradigm or technique for filtering the models based on the signal score may be used.

Next, at operation 212, the models are communicated as an output. In some configurations, the models 114 are presented on a user interface. In such configurations, the user interface may display a number of models that are ordered by a ranking that is based on the signal scores. The user interface may also be configured with controls for selecting a desired model for use. It can be appreciated that, in some configurations, the user interface may include a rendering or transformation of the model. Additional details and examples of other user interfaces are described below and shown in FIGS. 6A and 6B.

As can be appreciated, the output generated in operation 212 may involve the communication of the model 114 to one or more software modules, such as an authoring tool, or different computing devices. It can also be appreciated that operation 214 may save model data to a storage device. The output of operation 212 may include a model. As summarized above, a model may be any data structure configured to define one or more viewing parameters of an image. For example, a model may define one or more perspectives of the image by emphasizing various features and focal points of one or more regions of interest. For instance, a model may focus on a particular element, such as a strong line, or a model may focus on a combination of elements, such as a strong line and a face. In one example, a model may define cropping coordinates of an image to bring focus to one or more regions of interest.

Figure 6A:
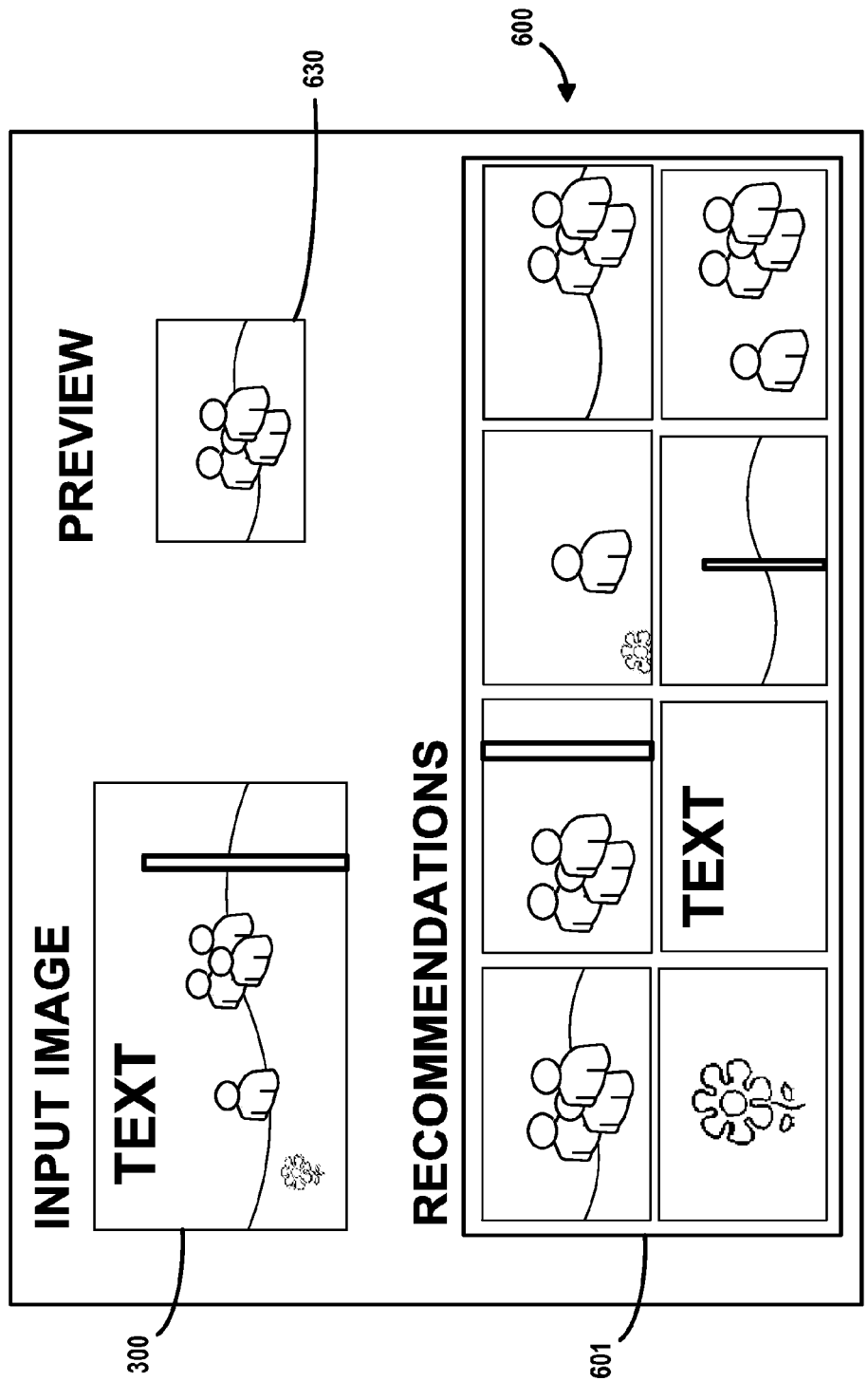

Next, at operation 214, the program module may obtain feedback associated with the models that were provided as an output in operation 212. As summarized above, multi-tiered feedback mechanisms allow for the collection of various forms of input. For instance, at a first level, an input received in response to the presentation of a model may include a selection of one of the displayed models. An example of a user interface for obtaining feedback at the first level is shown in FIGS. 6A and 6B.

At a second level, an input received in response to the presentation of a model may include data indicating user "intent" which may be interpreted by one or more user gestures. At this level, feedback associated with the models may be obtained and used to generate additional models that are based on the interpreted "intent." As described below and shown in FIGS. 7A-7D, one or more gestures may be used to bring highlight to a particular element of an image. For example, one or more gestures provided by a user may be interpreted by techniques described herein to raise or lower the priority of a feature, object or region of interest in a rendered model. As will be described below, interpretation of the gesture may influence the program modules 108 to generate additional models focusing on the important features highlighted in the feedback. An example of a user interface for obtaining feedback at this level is shown in FIGS. 7A-7D.

At a third level, an input received in response to the presentation of a model may include explicit instructions. As will be described in more detail below, an example of an explicit instruction may include the receipt of specific editing instructions, such as cropping coordinates of an image. An example user interface for obtaining feedback at this level is shown in FIG. 7E.

Next, at operation 216, the program module 108 determines if the routine 200 terminates or continues back to operation 206 where the program module 108 may generate additional models 114. In some configurations, the routine 200 may return to operation 206 if the feedback received at operation 214 includes feedback at the second level. For instance, if feedback defining user intent is obtained at operation 214, the feedback is processed along with other signals in operation 206 to generate additional models. However, at operation 214, if the obtained feedback is at the first level, e.g., a selection of one model, or at a third level, e.g., explicit cropping instructions, the routine 200 terminates. In some implementations, manual input from the user can be fully bypassed and the best ranked model can be automatically selected as an output. For example, in operation 210, the models may be ranked based on the signal score and one or more models may automatically selected for the generation of the output of operation 212. In such implementations, operations 214 and 216 may not be utilized.

As summarized above, the application of one or more signals may be applied to an image, such as image 300 of FIG. 3, to generate models that bring focus to one or more regions of interest of an image. One or more signals may be applied to an image based on a number of factors, including a confidence score associated with one or more regions of interest. As also described above, individual signals or combinations of signals may be applied to an input image to generate a model. In addition, multiple regions of interest may be aggregated and applied to one or more signals used to generate a model defining a perspective of one or more regions. Illustrative examples of several models are shown and described below with regard to FIGS. 5A-5C.

Referring now to FIGS. 5A-5C, a number of sample representations 501-512 of several sample models are provided. Specifically, FIG. 5A illustrates a first sample representation 501 where the application of the one or more signals creates a model that focuses on the group of people 302 and the sculpture 304. The second sample representation 502 illustrates an example where the application of the one or more signals creates a model that focuses on the flower 303, the person 301 and the horizon 306. The third sample representation 503 illustrates an example where the application of the signals creates a model that focuses on the flower 303 positioned in the center of the sample representation. In addition, the fourth sample representation 504 illustrates an example where the application of the one or more signals creates a model that focuses on the flower 303 having an off-center position.

FIG. 5B illustrates a fifth sample representation 505 where the application of the signals creates a model that focuses on the group of people 302 positioned in the center of the sample representation at a first focal point. The sixth sample representation 506 illustrates an example where the application of the signals creates a model that focuses on the group of people 302 at a second focal point. As can be appreciated, these examples show that an application of a signal focusing on a common region of interest may produce two different results as other aspects, such as a position or a focal distance, may vary.

The seventh sample representation 507 illustrates an example where the application of the signals creates a model that focuses on the person 301 and the group of people 302. The seventh sample representation 507 may result when there is an aggregation of two or more regions of interest, as explained above and shown in FIG. 4. The eighth sample representation 508 also focuses on the person 301 and the group of people 302. Although the focal distance for the seventh sample representation 507 and the eighth sample representation 508 may be the same, the eighth sample representation 508 illustrates a variation in the image position. In this example, the person 301 is cutoff by the viewport boundary. As described above, such a result may impact the scoring produced in operation 208.

FIG. 5C illustrates a ninth sample representation 509 where the application of the one or more signals creates a model that focuses on the sculpture 304. The tenth sample representation 510 illustrates an example where the application of the one or more signals creates a model that focuses on the group of people 302 having a position based on the Rule of Thirds. As summarized above, one or more of the signals may include a preference defining a photography principle. This example illustrates the use of such a signal. The eleventh sample representation 511 illustrates an example where the application of the one or more signals creates a model that focuses on the person 301 having a position based on the Rule of Thirds. This example also includes the text 305. This example illustrates an aggregation of two regions containing two different types of subjects, a person 301 and text 305. The twelfth sample representation 512 illustrates an example where the application of the one or more signals creates a model that focuses on the body of the person 304. As noted above, some of the areas of interest may include a portion of, or sections of, one or more regions.

FIG. 6A illustrates an example interface 600 that may be used to display one or more models, also referred to herein as "candidates." As shown, a recommendation section 601 depicts a number of candidates. In some configurations, the candidates may be ordered by the signal score. In addition, in some configurations, the interface 600 may display the original image 300 and a preview of how at least one candidate may be displayed in a preview section 630. In this example, the top ranked candidate is shown in the preview section 630. As can be appreciated, this example is provided for illustrative purposes and is not to be construed as limiting, as the interface 600 may include a number of other configurations and other types information.

The interface 600 may be configured to receive an input to select one of the candidates. For instance, a user may select the candidate displayed in the preview section 630 by the use of any input mechanism. In a specific example, touch-enabled features or user-controlled gestures may be used to select the candidate by pressing on or near the preview section 630. In addition, the interface 600 may allow a user to drag a candidate from the recommendation section 601 to the preview section 630. With this type of input, the preview section 630 may show a preview of any selected candidate. The user may then select the candidate in the preview section 630 as the selected candidate. Other gestures and user interface features may be used to select one or more candidates.

As described above, one or more signals may indicate an intended use. In some configurations, such signals may define a single viewport or multiple viewports. FIG. 6B illustrates another example interface 650 that may be used when a signal defines multiple layouts. As shown, the candidates that are generated and ranked in the above-described process are displayed in multiple layouts. The interface 650 may be configured with one or more controls to select a candidate. As can be appreciated, the interface 650 may also include the original image 300 and other candidates.

As summarized above, techniques described herein obtain and process multiple levels of feedback on the generated models. For instance, at a first level, an input may be received to select one of the displayed models. At a second level, feedback may include "user intent" which may be interpreted by one or more user gestures. At this level, feedback associated with the models may be obtained and used to generate additional models that are based on the interpreted "intent." As shown in the following examples, this type of feedback enables users to provide general information that may raise or lower priority to one or more regions of interest. At a third level, feedback may include explicit instructions, such as editing instructions, which are also referred to herein as editing parameters. As described above, FIGS. 6A-6B show examples of the first level of feedback, 7A-7E show examples of the second and third levels of feedback.

FIG. 7A illustrates the specific examples of various forms of input that may be used to communicate user intent. As shown, the interface 600 includes the original input image, the viewport preview and the recommendations area 601 described above. As also shown, the interface is 600 touch enabled to allow a user to draw shapes and markings on the interface.

In example of FIG. 7A, a user my bring highlight to one or more regions of interest my drawing circles around one or more regions of interest, or create new regions of interest by drawing one or more shapes, such as the circles shown in the input image and the candidates shown in the recommendations area 601. In these examples, a first circle 701 is drawn around the person, which may be interpreted as a desire to see more candidates including the person.

In another example, another circle 702 is drawn around the group of people and the sculpture, which may be interpreted as a desire to see more candidates including the group of people and the sculpture. Other gestures 703 may include a circle around an object, such as the sculpture, and another gesture, such as an arrow, which may be interpreted as a desire to see more models with the object positioned in a different location. This type of input, for example, may indicate that the use would like to see more candidates with the desired object following the Rule of Thirds. Although specific markings, such as circles, are used in this example, any shape, marking or gesture may be used to show intent, which may raise or lower a priority to one or more regions of interest and/or signals that may be applied to an image.

Figure 7B:
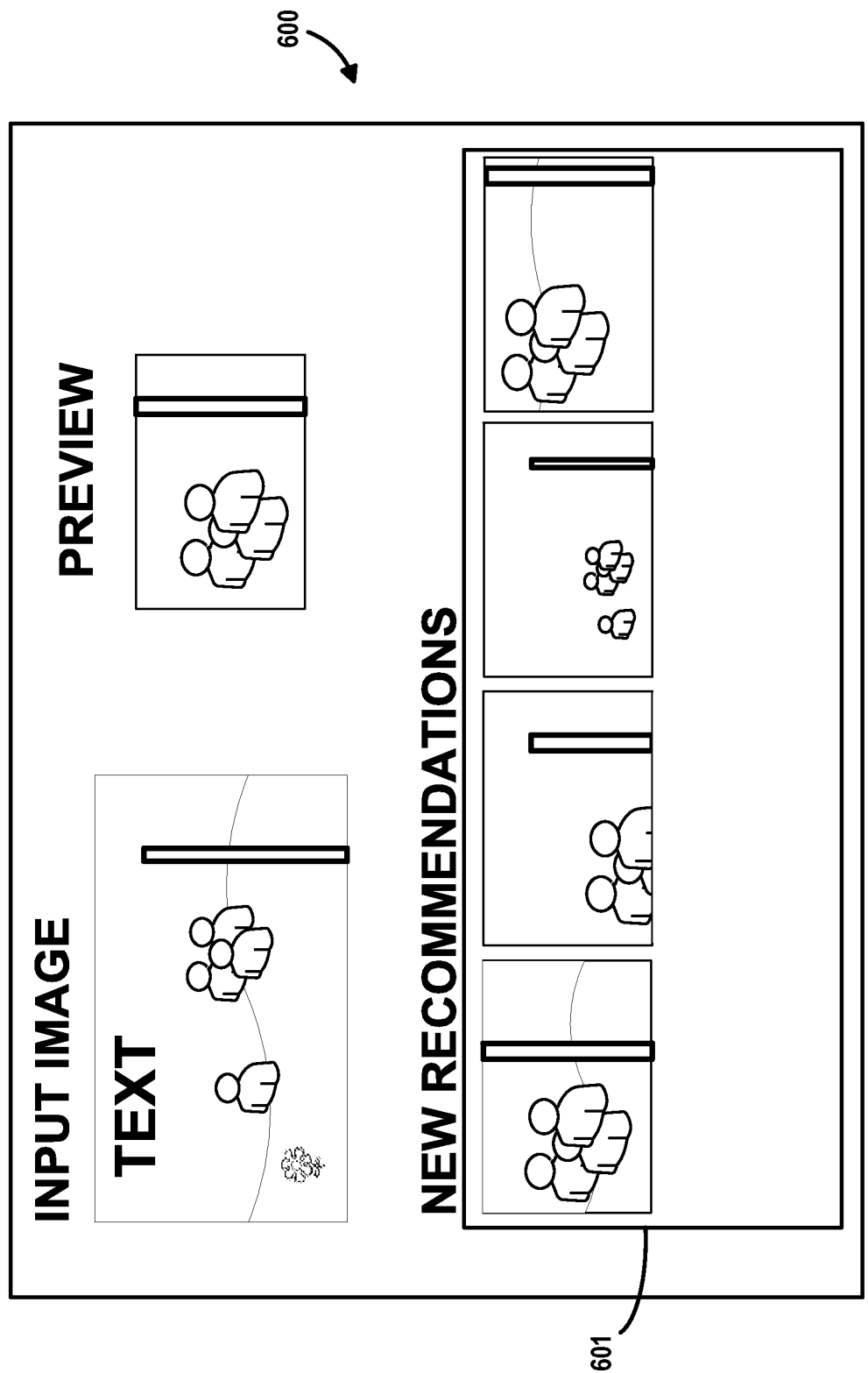

FIG. 7B is an example interface 600 that may be generated in response to one of the example inputs received in FIG. 7A. In this particular example, a new set of models are provided in the recommendations area 601 and the preview section 630. Specifically, the sample candidates shown in FIG. 7B are based on the circle 702 drawn around the group of people and the sculpture. Based on this example input, models emphasizing different perspectives of the desired regions and other regions may be generated, filtered, ranked and displayed.

Figure 7C:
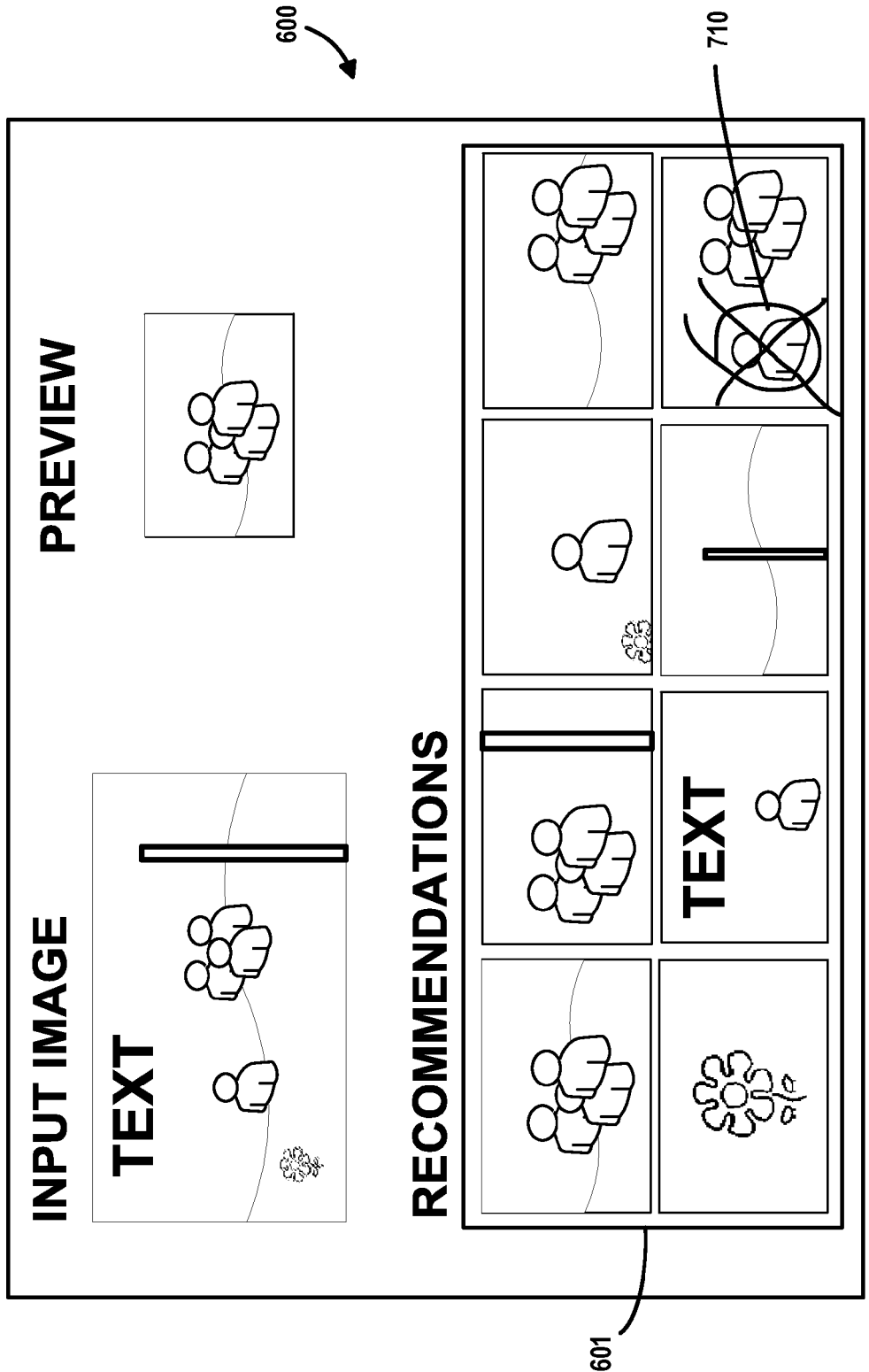

FIG. 7C illustrates an example where an input gesture may indicate regions or objects that are not desired. In this example, a gesture pattern 710, e.g., a pattern that crosses out an object or region, may indicate that a user may desire to see fewer candidates related to those particular objects or regions. Such a gesture may also indicate that the user desires to eliminate an object or region of interest. Regions or objects may be eliminated from models that are generated in response to such input gestures.

Figure 7D:
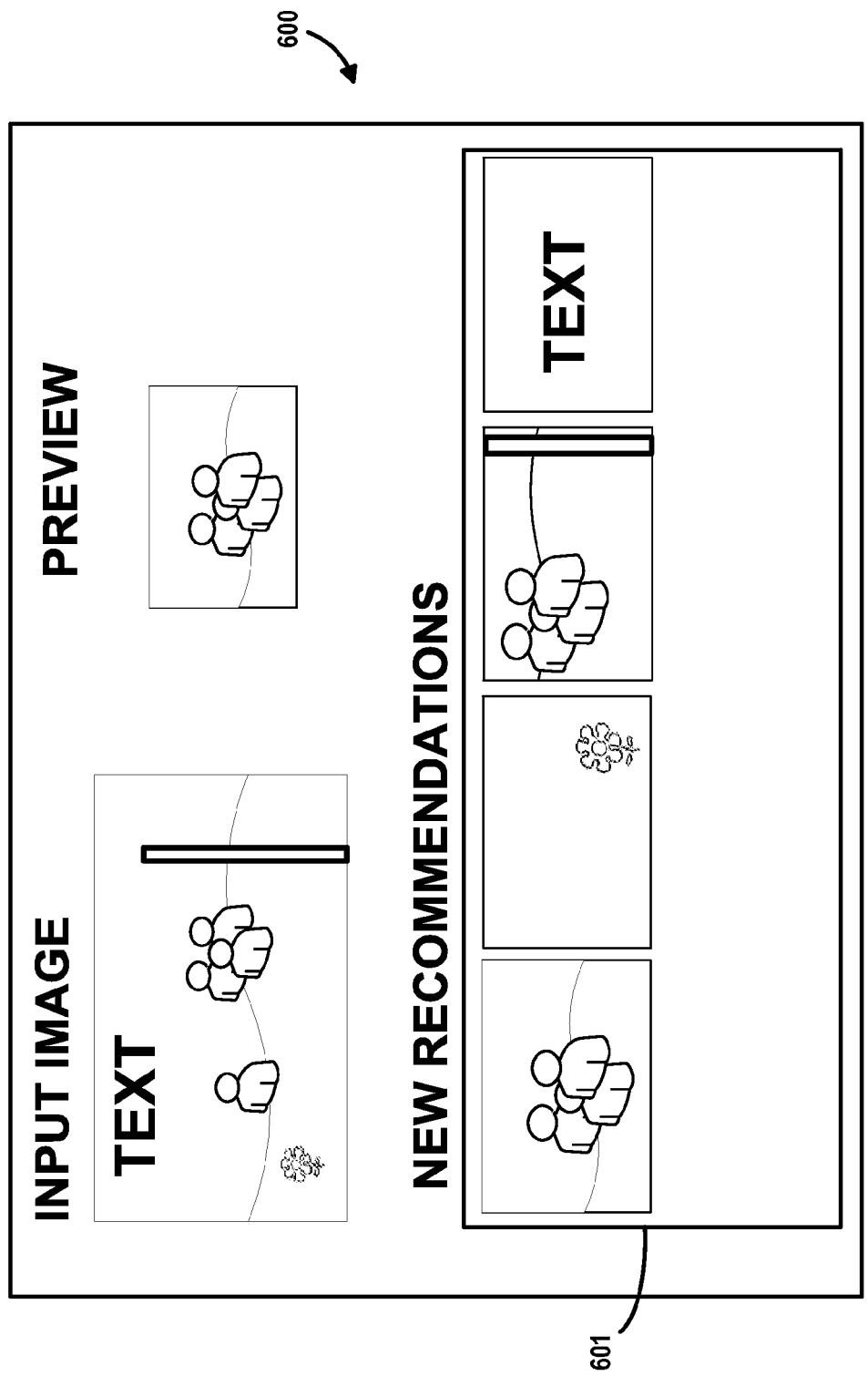
Figure 7E:
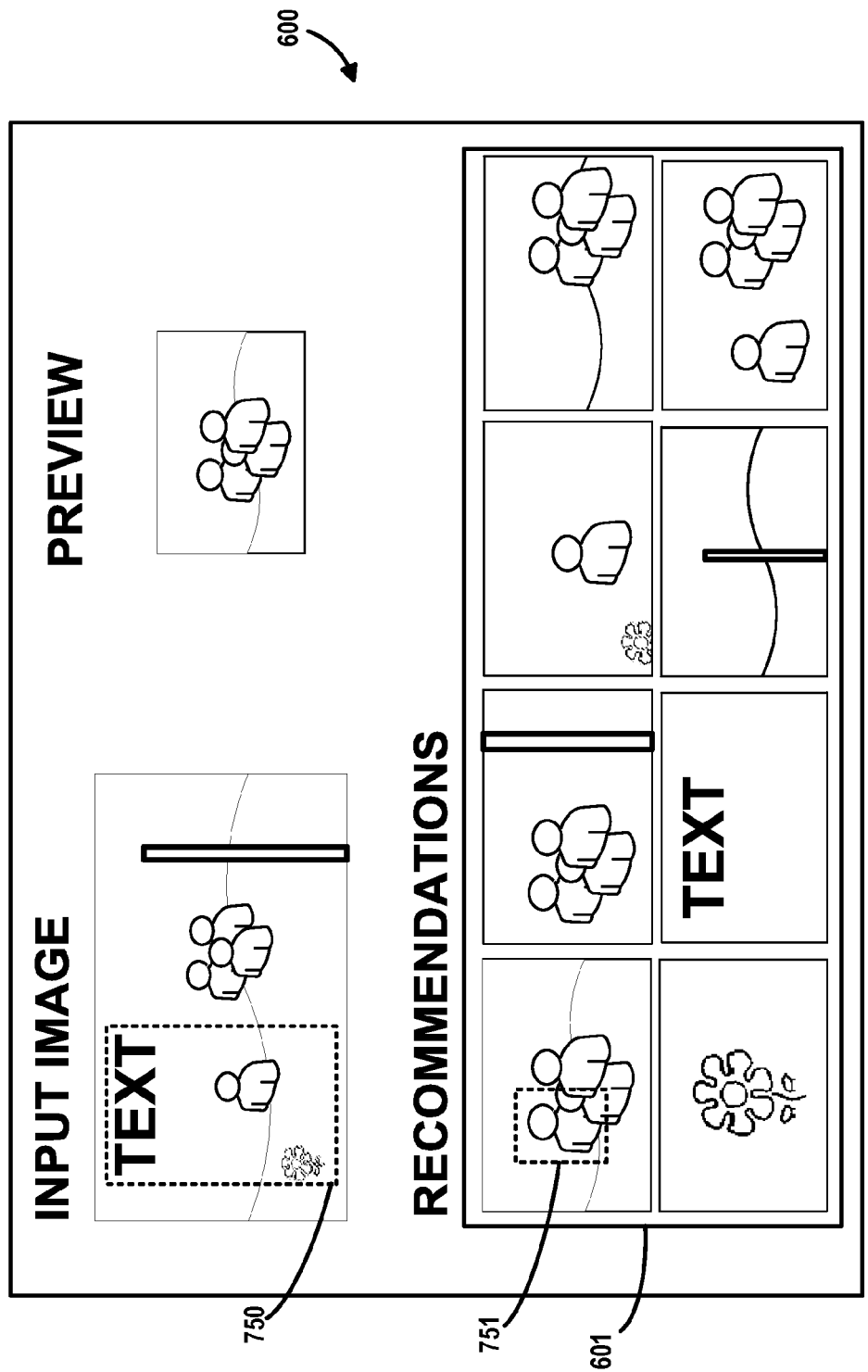

FIG. 7D is an example interface 600 that may be generated in response to the example input 710 received in FIG. 7C. In this particular example, a new set of models are generated and rendered in the recommendations area 601 and the preview section 630. Specifically, based on the input 710 received in FIG. 7C, e.g., a cross through the person in the image, the candidates shown in FIG. 7D focus on other regions and do not show the person.

As can be appreciated, data indicating intent may be received each time an interface 600 is generated. By processing this type of input, as shown in the flow diagram of FIG. 2, a system utilizing techniques disclosed herein may continually generate a new set of candidates, where each iteration generating new models will have a refined view of what the user may be looking for. Each iteration may also consider data from external sources, such as a user profile, a historical database, or other resources to refine the candidates. However, at any point, the user may also break the cycle by selecting a candidate for use, or by entering explicit editing instructions or editing parameters.

FIG. 7E illustrates one example of an interface 600 receiving explicit editing instructions. In this example, specific cropping parameters, e.g., a first cropping parameter 750 and/or a second cropping parameter 751 are drawn by the user. The receipt of cropping parameters may generate an output in the form of a model utilizing the received cropping parameters. As can be appreciated, the receipt of cropping parameters may generate another set of candidates for display to the user.

As summarized above, techniques described herein may utilize the feedback, e.g., the input received at operation 214, for machine learning purposes. Generally described, implementations of routine 200 of FIG. 2 may store and process the feedback to allow the routine 200 to benefit from historical feedback data. In some configurations, stored feedback information may be used to influence the techniques described herein to select certain types signals or combinations of signals. For instance, if a data store contains a number of feedback entries that indicate a preference for a particular signal, e.g., a signal that brings focus to salient regions with text, techniques disclosed herein may utilize such data to increase the use of such signals. Conversely, if the historical feedback data indicates that certain signals are not desirable, e.g., a signal that brings focus to groups of people, techniques disclosed herein may utilize such data to minimize or eliminate the use of such signals.

The machine learning features may also involve the use of other data and contextual information. For instance, with respect to example of FIG. 7C, if a user gesture indicates that a particular person is not desired, a face recognition technology may be used to identify a profile related to the person in the picture. Such information, e.g., any information related to the identified person, may be stored in the database. The stored information may be accessed and utilized by the system when other images are processed, and based on the feedback and the stored information related to the identified person, one or more signals may be used to reduce or eliminate the number of candidates that bring focus to that person. Although these examples are provided for illustrative purposes, such examples should not be construed as limiting. It can be appreciated that a preference related to any object or feature of an image, or any preference for a signal, may be stored and used by techniques described herein.

Figure 8:
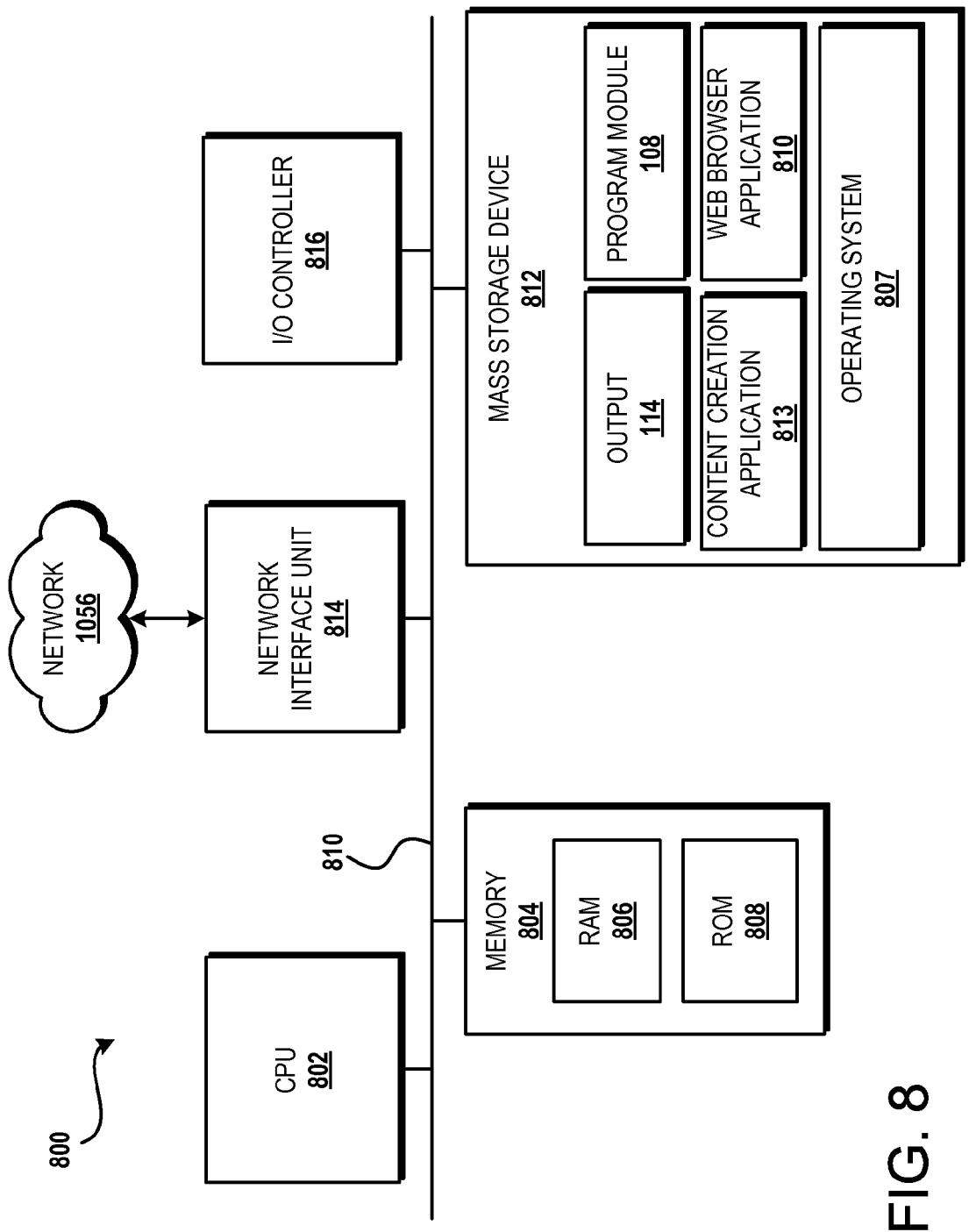
FIG. 8 is a computer architecture diagram illustrating an illustrative computer hardware and software architecture for a computing system capable of implementing aspects of the techniques and technologies presented herein.

FIG. 8 shows additional details of an example computer architecture 800 for a computer, such as the computing device 102 (FIG. 1), capable of executing the program components described above for optimizing a visual perspective of media. Thus, the computer architecture 800 illustrated in FIG. 8 illustrates an architecture for a server computer, mobile phone, a PDA, a smart phone, a desktop computer, a netbook computer, a tablet computer, and/or a laptop computer. The computer architecture 800 may be utilized to execute any aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 807, and one or more application programs including, but not limited to, the content creation application 813, program module 108, and a web browser application 810. The illustrated mass storage device 812 may also store output 114 or a file, which may be a content file or a file configured to store an image or other form of media.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes the claims, the phrase "computer storage medium," "computer-readable storage medium" and variations thereof, does not include waves, signals, and/or other transitory and/or intangible communication media, per se.

According to various configurations, the computer architecture 800 may operate in a networked environment using logical connections to remote computers through the network 1056 and/or another network (not shown). The computer architecture 800 may connect to the network 1056 through a network interface unit 814 connected to the bus 810. It should be appreciated that the network interface unit 814 also may be utilized to connect to other types of networks and remote computer systems. The computer architecture 800 also may include an input/output controller 816 for receiving and processing input from a number of other devices, including a keyboard, mouse, or electronic stylus (not shown in FIG. 8). Similarly, the input/output controller 816 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Figure 9:
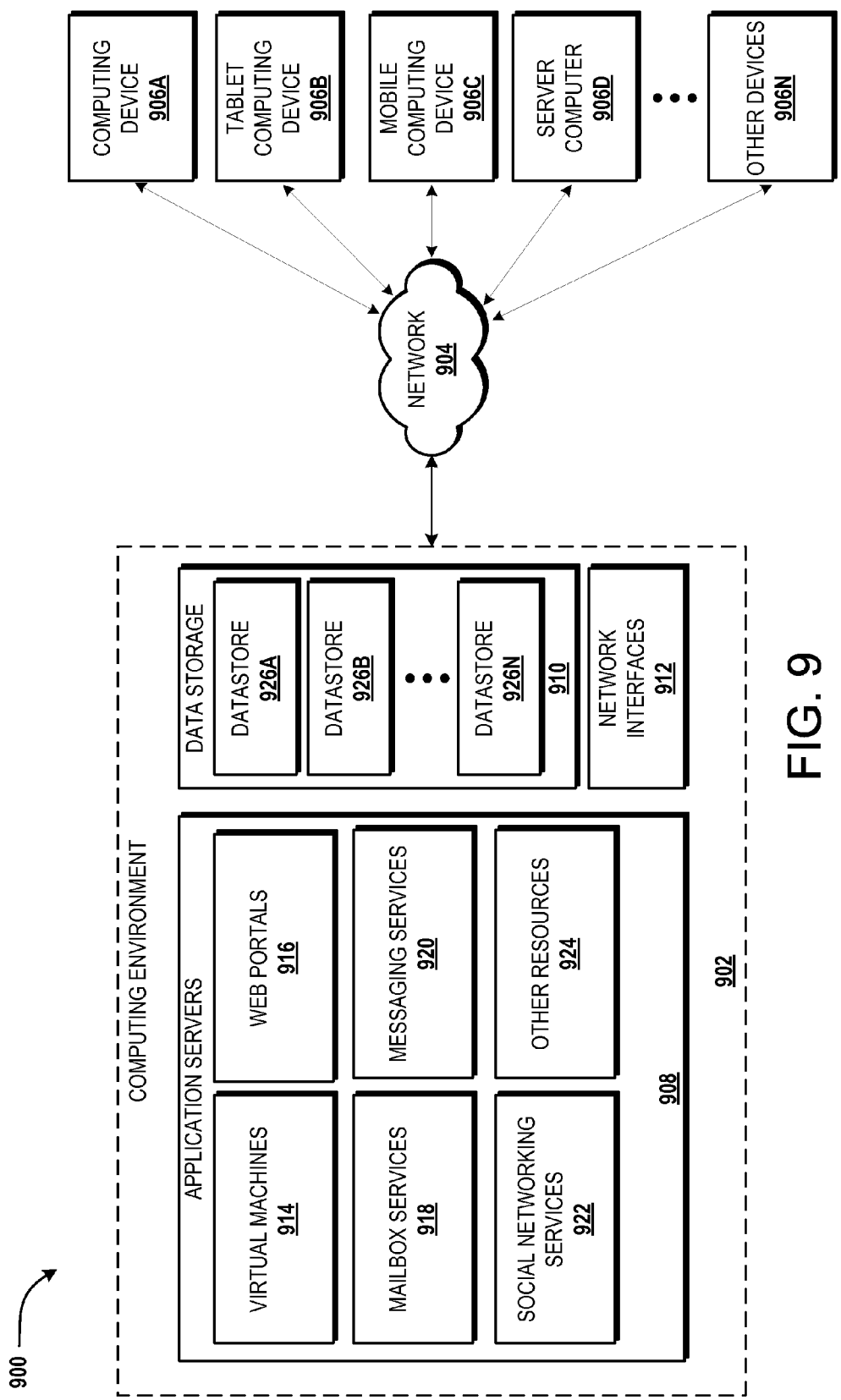
FIG. 9 is a diagram illustrating a distributed computing environment capable of implementing aspects of the techniques and technologies presented herein.

FIG. 9 depicts an illustrative distributed computing environment 900 capable of executing the software components described herein for optimizing a visual perspective of media. Thus, the distributed computing environment 900 illustrated in FIG. 9 can be utilized to execute any aspects of the software components presented herein. For example, the distributed computing environment 900 can be utilized to execute aspects of the content creation application 813, the program module 108 and/or other software components described herein.

According to various implementations, the distributed computing environment 900 includes a computing environment 902 operating on, in communication with, or as part of the network 904. The network 904 may be or may include the network 1056, described above with reference to FIG. 8. The network 904 also can include various access networks. One or more client devices 906A-906N (hereinafter referred to collectively and/or generically as "clients 906") can communicate with the computing environment 902 via the network 904 and/or other connections (not illustrated in FIG. 9). In one illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902. Two example computing architectures for the clients 906 are illustrated and described herein with reference to FIGS. 8 and 10. It should be understood that the illustrated clients 906 and computing architectures illustrated and described herein are illustrative, and should not be construed as being limited in any way.

In the illustrated configuration, the computing environment 902 includes application servers 908, data storage 910, and one or more network interfaces 912. According to various implementations, the functionality of the application servers 908 can be provided by one or more server computers that are executing as part of, or in communication with, the network 904. The application servers 908 can host various services, virtual machines, portals, and/or other resources. In the illustrated configuration, the application servers 908 host one or more virtual machines 914 for hosting applications or other functionality. According to various implementations, the virtual machines 914 host one or more applications and/or software modules for optimizing a visual perspective of media. It should be understood that this configuration is illustrative, and should not be construed as being limiting in any way. The application servers 908 also host or provide access to one or more portals, link pages, Web sites, and/or other information ("Web portals") 916.

According to various implementations, the application servers 908 also include one or more mailbox services 918 and one or more messaging services 920. The mailbox services 918 can include electronic mail ("email") services. The mailbox services 918 also can include various personal information management ("PIM") services including, but not limited to, calendar services, contact management services, collaboration services, and/or other services. The messaging services 920 can include, but are not limited to, instant messaging services, chat services, forum services, and/or other communication services.

The application servers 908 also may include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 922 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 922 also can include commenting, blogging, and/or micro blogging services. Examples of such services include, but are not limited to, the YELP commenting service, the KUDZU review service, the YAMMER enterprise micro blogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the above configurations are illustrative, and should not be construed as being limited in any way. According to various implementations, the social networking services 922 may host one or more applications and/or software modules for providing the functionality described herein for optimizing a visual perspective of media. For instance, any one of the application servers 908 may communicate or facilitate the functionality and features described herein. For instance, a social networking application, mail client, messaging client or a browser running on a phone or any other client 906 may communicate with a networking service 922 and facilitate the functionality, even in part, described above with respect to FIG. 3.

As shown in FIG. 9, the application servers 908 also can host other services, applications, portals, and/or other resources ("other resources") 924. The other resources 924 can include, but are not limited to image processing functionality. It thus can be appreciated that the computing environment 902 can provide integration of the concepts and technologies disclosed herein provided herein with various mailbox, messaging, social networking, and/or other services or resources.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the content creation application 813 and/or other data. Although not illustrated in FIG. 9, the datastores 926 also can host or store images, data structures, algorithms for execution by a recommendation engine, and/or other data utilized by a content creation program or another module, such as the program module 108. Aspects of the datastores 926 may be associated with a service, such as ONEDRIVE, DROPBOX or GOOGLEDRIVE.

The computing environment 902 can communicate with, or be accessed by, the network interfaces 912. The network interfaces 912 can include various types of network hardware and software for supporting communications between two or more computing devices including, but not limited to, the clients 906 and the application servers 908. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the clients 906. It should be understood that the clients 906 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for optimizing a visual perspective of media, among other aspects. In one specific example, as summarized above, techniques described herein may be implemented, at least in part, by the web browser application 810 of FIG. 8, which works in conjunction with the application servers 908 of FIG. 9.

Figure 10:
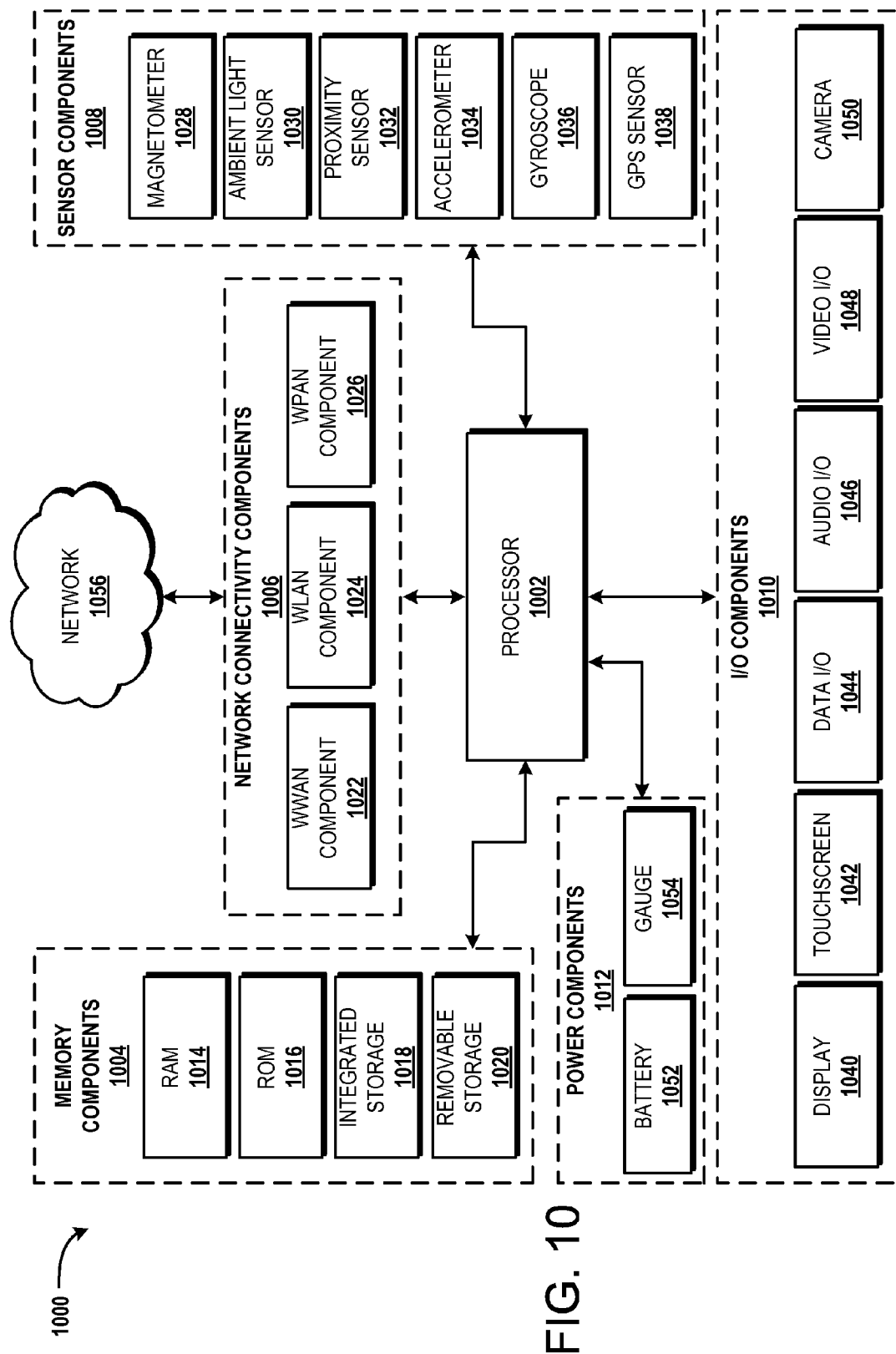
FIG. 10 is a computer architecture diagram illustrating a computing device architecture for a computing device capable of implementing aspects of the techniques and technologies presented herein.

Turning now to FIG. 10, an illustrative computing device architecture 1000 for a computing device that is capable of executing various software components described herein for optimizing a visual perspective of media. The computing device architecture 1000 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1000 is applicable to any of the clients 906 shown in FIG. 9. Moreover, aspects of the computing device architecture 1000 may be applicable to traditional desktop computers, portable computers (e.g., laptops, notebooks, ultra-portables, and netbooks), server computers, and other computer systems, such as described herein with reference to FIG. 8. For example, the single touch and multi-touch aspects disclosed herein below may be applied to desktop computers that utilize a touchscreen or some other touch-enabled device, such as a touch-enabled track pad or touch-enabled mouse.

The computing device architecture 1000 illustrated in FIG. 10 includes a processor 1002, memory components 1004, network connectivity components 1006, sensor components 1008, input/output components 1010, and power components 1012. In the illustrated configuration, the processor 1002 is in communication with the memory components 1004, the network connectivity components 1006, the sensor components 1008, the input/output ("I/O") components 1010, and the power components 1012. Although no connections are shown between the individuals components illustrated in FIG. 10, the components can interact to carry out device functions. In some configurations, the components are arranged so as to communicate via one or more busses (not shown).

The processor 1002 includes a central processing unit ("CPU") configured to process data, execute computer-executable instructions of one or more application programs, and communicate with other components of the computing device architecture 1000 in order to perform various functionality described herein. The processor 1002 may be utilized to execute aspects of the software components presented herein and, particularly, those that utilize, at least in part, a touch-enabled input.

In some configurations, the processor 1002 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 1002 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1002 is, or is included in, a system-on-chip ("SoC") along with one or more of the other components described herein below. For example, the SoC may include the processor 1002, a GPU, one or more of the network connectivity components 1006, and one or more of the sensor components 1008. In some configurations, the processor 1002 is fabricated, in part, utilizing a package-on-package ("PoP") integrated circuit packaging technique. The processor 1002 may be a single core or multi-core processor.

The processor 1002 may be created in accordance with an ARM architecture, available for license from ARM HOLDINGS of Cambridge, United Kingdom. Alternatively, the processor 1002 may be created in accordance with an x86 architecture, such as is available from INTEL CORPORATION of Mountain View, Calif. and others. In some configurations, the processor 1002 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1004 include a random access memory ("RAM") 1014, a read-only memory ("ROM") 1016, an integrated storage memory ("integrated storage") 1018, and a removable storage memory ("removable storage") 1020. In some configurations, the RAM 1014 or a portion thereof, the ROM 1016 or a portion thereof, and/or some combination the RAM 1014 and the ROM 1016 is integrated in the processor 1002. In some configurations, the ROM 1016 is configured to store a firmware, an operating system or a portion thereof (e.g., operating system kernel), and/or a bootloader to load an operating system kernel from the integrated storage 1018 and/or the removable storage 1020.

The integrated storage 1018 can include a solid-state memory, a hard disk, or a combination of solid-state memory and a hard disk. The integrated storage 1018 may be soldered or otherwise connected to a logic board upon which the processor 1002 and other components described herein also may be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some configurations, the removable storage 1020 is provided in lieu of the integrated storage 1018. In other configurations, the removable storage 1020 is provided as additional optional storage. In some configurations, the removable storage 1020 is logically combined with the integrated storage 1018 such that the total available storage is made available as a total combined storage capacity. In some configurations, the total combined capacity of the integrated storage 1018 and the removable storage 1020 is shown to a user instead of separate storage capacities for the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various configurations, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from the network 1056 or another network, which may be a WWAN, a WLAN, or a WPAN. Although only the network 1056 is illustrated, the network connectivity components 1006 may facilitate simultaneous communication with multiple networks, including the network 904 of FIG. 9. For example, the network connectivity components 1006 may facilitate simultaneous communications with multiple networks via one or more of a WWAN, a WLAN, or a WPAN.

The network 1056 may be or may include a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1056 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 104 may be configured to provide voice and/or data communications with any combination of the above technologies. The network 1056 may be configured to or adapted to provide voice and/or data communications in accordance with future generation technologies.

In some configurations, the WWAN component 1022 is configured to provide dual-multi-mode connectivity to the network 1056. For example, the WWAN component 1022 may be configured to provide connectivity to the network 1056, wherein the network 1056 provides service via GSM and UMTS technologies, or via some other combination of technologies. Alternatively, multiple WWAN components 1022 may be utilized to perform such functionality, and/or provide additional functionality to support other non-compatible technologies (i.e., incapable of being supported by a single WWAN component). The WWAN component 1022 may facilitate similar connectivity to multiple networks (e.g., a UMTS network and an LTE network).

The network 1056 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1024 is configured to connect to the network 1056 via the WI-FI access points. Such connections may be secured via various encryption technologies including, but not limited, WI-FI Protected Access ("WPA"), WPA2, Wired Equivalent Privacy ("WEP"), and the like.

The network 1056 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1026 is configured to facilitate communications with other devices, such as peripherals, computers, or other computing devices via the WPAN.

The sensor components 1008 include a magnetometer 1028, an ambient light sensor 1030, a proximity sensor 1032, an accelerometer 1034, a gyroscope 1036, and a Global Positioning System sensor ("GPS sensor") 1038. It is contemplated that other sensors, such as, but not limited to, temperature sensors or shock detection sensors, also may be incorporated in the computing device architecture 1000.

The magnetometer 1028 is configured to measure the strength and direction of a magnetic field. In some configurations the magnetometer 1028 provides measurements to a compass application program stored within one of the memory components 1004 in order to provide a user with accurate directions in a frame of reference including the cardinal directions, north, south, east, and west. Similar measurements may be provided to a navigation application program that includes a compass component. Other uses of measurements obtained by the magnetometer 1028 are contemplated.

The ambient light sensor 1030 is configured to measure ambient light. In some configurations, the ambient light sensor 1030 provides measurements to an application program stored within one the memory components 1004 in order to automatically adjust the brightness of a display (described below) to compensate for low-light and high-light environments. Other uses of measurements obtained by the ambient light sensor 1030 are contemplated.

The proximity sensor 1032 is configured to detect the presence of an object or thing in proximity to the computing device without direct contact. In some configurations, the proximity sensor 1032 detects the presence of a user's body (e.g., the user's face) and provides this information to an application program stored within one of the memory components 1004 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1028 are contemplated.

The accelerometer 1034 is configured to measure proper acceleration. In some configurations, output from the accelerometer 1034 is used by an application program as an input mechanism to control some functionality of the application program. For example, the application program may be a video game in which a character, a portion thereof, or an object is moved or otherwise manipulated in response to input received via the accelerometer 1034. In some configurations, output from the accelerometer 1034 is provided to an application program for use in switching between landscape and portrait modes, calculating coordinate acceleration, or detecting a fall. Other uses of the accelerometer 1034 are contemplated.

The gyroscope 1036 is configured to measure and maintain orientation. In some configurations, output from the gyroscope 1036 is used by an application program as an input mechanism to control some functionality of the application program. For example, the gyroscope 1036 can be used for accurate recognition of movement within a 3D environment of a video game application or some other application. In some configurations, an application program utilizes output from the gyroscope 1036 and the accelerometer 1034 to enhance control of some functionality of the application program. Other uses of the gyroscope 1036 are contemplated.

The GPS sensor 1038 is configured to receive signals from GPS satellites for use in calculating a location. The location calculated by the GPS sensor 1038 may be used by any application program that requires or benefits from location information. For example, the location calculated by the GPS sensor 1038 may be used with a navigation application program to provide directions from the location to a destination or directions from the destination to the location. Moreover, the GPS sensor 1038 may be used to provide location information to an external location-based service, such as E911 service. The GPS sensor 1038 may obtain location information generated via WI-FI, WIMAX, and/or cellular triangulation techniques utilizing one or more of the network connectivity components 1006 to aid the GPS sensor 1038 in obtaining a location fix. The GPS sensor 1038 may also be used in Assisted GPS ("A-GPS") systems.

The I/O components 1010 include a display 1040, a touchscreen 1042, a data I/O interface component ("data I/O") 1044, an audio I/O interface component ("audio I/O") 1046, a video I/O interface component ("video I/O") 1048, and a camera 1050. In some configurations, the display 1040 and the touchscreen 1042 are combined. In some configurations two or more of the data I/O component 1044, the audio I/O component 1046, and the video I/O component 1048 are combined. The I/O components 1010 may include discrete processors configured to support the various interface described below, or may include processing functionality built-in to the processor 1002.

The display 1040 is an output device configured to present information in a visual form. In particular, the display 1040 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1040 is a liquid crystal display ("LCD") utilizing any active or passive matrix technology and any backlighting technology (if used). In some configurations, the display 1040 is an organic light emitting diode ("OLED") display. Other display types are contemplated.

The touchscreen 1042, also referred to herein as a "touch-enabled screen," is an input device configured to detect the presence and location of a touch. The touchscreen 1042 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1042 is incorporated on top of the display 1040 as a transparent layer to enable a user to use one or more touches to interact with objects or other information presented on the display 1040. In other configurations, the touchscreen 1042 is a touch pad incorporated on a surface of the computing device that does not include the display 1040. For example, the computing device may have a touchscreen incorporated on top of the display 1040 and a touch pad on a surface opposite the display 1040.

In some configurations, the touchscreen 1042 is a single-touch touchscreen. In other configurations, the touchscreen 1042 is a multi-touch touchscreen. In some configurations, the touchscreen 1042 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1042. As such, a developer may create gestures that are specific to a particular application program.

In some configurations, the touchscreen 1042 supports a tap gesture in which a user taps the touchscreen 1042 once on an item presented on the display 1040. The tap gesture may be used for various reasons including, but not limited to, opening or launching whatever the user taps. In some configurations, the touchscreen 1042 supports a double tap gesture in which a user taps the touchscreen 1042 twice on an item presented on the display 1040. The double tap gesture may be used for various reasons including, but not limited to, zooming in or zooming out in stages. In some configurations, the touchscreen 1042 supports a tap and hold gesture in which a user taps the touchscreen 1042 and maintains contact for at least a pre-defined time. The tap and hold gesture may be used for various reasons including, but not limited to, opening a context-specific menu.

In some configurations, the touchscreen 1042 supports a pan gesture in which a user places a finger on the touchscreen 1042 and maintains contact with the touchscreen 1042 while moving the finger on the touchscreen 1042. The pan gesture may be used for various reasons including, but not limited to, moving through screens, images, or menus at a controlled rate. Multiple finger pan gestures are also contemplated. In some configurations, the touchscreen 1042 supports a flick gesture in which a user swipes a finger in the direction the user wants the screen to move. The flick gesture may be used for various reasons including, but not limited to, scrolling horizontally or vertically through menus or pages. In some configurations, the touchscreen 1042 supports a pinch and stretch gesture in which a user makes a pinching motion with two fingers (e.g., thumb and forefinger) on the touchscreen 1042 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 1042. As such, the above gestures should be understood as being illustrative and should not be construed as being limiting in any way.

The data I/O interface component 1044 is configured to facilitate input of data to the computing device and output of data from the computing device. In some configurations, the data I/O interface component 1044 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1046 is configured to provide audio input and/or output capabilities to the computing device. In some configurations, the audio I/O interface component 1046 includes a microphone configured to collect audio signals. In some configurations, the audio I/O interface component 1046 includes a headphone jack configured to provide connectivity for headphones or other external speakers. In some configurations, the audio I/O interface component 1046 includes a speaker for the output of audio signals. In some configurations, the audio I/O interface component 1046 includes an optical audio cable out.

The video I/O interface component 1048 is configured to provide video input and/or output capabilities to the computing device. In some configurations, the video I/O interface component 1048 includes a video connector configured to receive video as input from another device (e.g., a video media player such as a DVD or BLURAY player) or send video as output to another device (e.g., a monitor, a television, or some other external display). In some configurations, the video I/O interface component 1048 includes a High-Definition Multimedia Interface ("HDMI"), mini-HDMI, micro-HDMI, DisplayPort, or proprietary connector to input/output video content. In some configurations, the video I/O interface component 1048 or portions thereof is combined with the audio I/O interface component 1046 or portions thereof.

The camera 1050 can be configured to capture still images and/or video. The camera 1050 may utilize a charge coupled device ("CCD") or a complementary metal oxide semiconductor ("CMOS") image sensor to capture images. In some configurations, the camera 1050 includes a flash to aid in taking pictures in low-light environments. Settings for the camera 1050 may be implemented as hardware or software buttons.

Although not illustrated, one or more hardware buttons may also be included in the computing device architecture 1000. The hardware buttons may be used for controlling some operational aspect of the computing device. The hardware buttons may be dedicated buttons or multi-use buttons. The hardware buttons may be mechanical or sensor-based.

The illustrated power components 1012 include one or more batteries 1052, which can be connected to a battery gauge 1054. The batteries 1052 may be rechargeable or disposable. Rechargeable battery types include, but are not limited to, lithium polymer, lithium ion, nickel cadmium, and nickel metal hydride. Each of the batteries 1052 may be made of one or more cells.

The battery gauge 1054 can be configured to measure battery parameters such as current, voltage, and temperature. In some configurations, the battery gauge 1054 is configured to measure the effect of a battery's discharge rate, temperature, age and other factors to predict remaining life within a certain percentage of error. In some configurations, the battery gauge 1054 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1012 may also include a power connector, which may be combined with one or more of the aforementioned I/O components 1010. The power components 1012 may interface with an external power system or charging equipment via a power I/O component.

The disclosure presented herein may be considered in view of the following clauses.

Clause 1: A computer-implemented method comprising: obtaining data defining an intended use of an image (300); determining a plurality of regions (401-410) of the image by applying a plurality of signals to the image; determining a confidence score for individual regions (401-410) of the plurality of regions (401-410); and generating a plurality of models (114), wherein individual models (114) of the plurality of models (114) define at least one selected region of the image (300), and wherein the at least one selected region is based on, at least in part, the intended use and the confidence score for the at least one selected region.

Clause 2: The example of clause 1, wherein individual models of the plurality of models are generated by applying one or more signals to the image to define the at least one selected region of the image, and wherein the computer-implemented method further comprises: determining a signal score for individual models of the plurality of models; filtering individual models based on the signal score to determine selected models; and displaying a transformation of the selected models, wherein an order of the display of the selected models is based on the signal score.

Clause 3: The example of clauses 1 and 2, wherein the signal score is based on a success rating for the plurality of signals that are applied to the image.

Clause 4: The example of clauses 1-3, further comprising: displaying a transformation of individual models of the plurality of models; and receiving a selection of a single model of the plurality of models.

Clause 5: The example of clauses 1-4, further comprising: displaying a transformation of individual models of the plurality of models on an interface; receiving, at the interface, a gesture input indicating an intent directed toward one or more regions associated with at least one model; and in response to the gesture input, generating additional models based on the intent.

Clause 6: The example of clauses 1-5, further comprising: displaying a transformation of individual models of the plurality of models; receiving an edit parameter for the image; and generating a model based on the edit parameter.

Clause 7: The example of clauses 1-6, wherein determining the plurality of regions of the image comprises utilizing signals for identifying a salient region, an invariant region, a strong line or a subject included in the image.

Clause 8: A computer (800, 1000), comprising: a processor (802, 1002); and a computer-readable storage medium (804, 1004) in communication with the processor (802, 1002), the computer-readable storage medium (804, 1004) having computer-executable instructions stored thereupon which, when executed by the processor (802, 1002), cause the computer (800, 1000) to obtain data defining an intended use of an image (300), determine a plurality of regions (401-410) of the image (300) by applying a plurality of signals to the image (300), determine a confidence score for individual regions of the plurality of regions (401-410), and generate a plurality of models (114), wherein individual models (114) of the plurality of models (114) define at least one selected region of the image (300), and wherein the at least one selected region is based on, at least in part, the intended use and the confidence score for the at least one selected region.

Clause 9: The computer of clause 8, wherein individual models of the plurality of models are generated by applying one or more signals to the image to define the at least one selected region of the image, and wherein the computer-readable storage medium has further computer-executable instructions stored thereupon, which when executed by the processor, cause the computer to: determine a signal score for individual models of the plurality of models; filter individual models based on the signal score to determine selected models; and display a transformation of the selected models, wherein an order of display of the selected models is based on the signal score.

Clause 10: The computer of clauses 8-9, wherein the signal score is based on a success rating success rating for the one or more signals that are applied to the image.

Clause 11: The computer of clauses 8-10, wherein the computer-readable storage medium has further computer-executable instructions stored thereupon, which when executed by the processor, cause the computer to: display a transformation of individual models of the plurality of models; and receive a selection of a single model of the plurality of models.

Clause 12: The computer of clauses 8-11, wherein the computer-readable storage medium has further computer-executable instructions stored thereupon, which when executed by the processor, cause the computer to: display a transformation of individual models of the plurality of models on an interface; receive, at the interface, a gesture input indicating an intent directed toward one or more regions associated with at least one model; and generate one or more additional models based on the intent in response to the gesture input.

Clause 13: The computer of clauses 8-12, wherein the computer-readable storage medium has further computer-executable instructions stored thereupon, which when executed by the processor, cause the computer to: display a transformation of individual models of the plurality of models; receive an edit parameter for the image; and generate a model based on the edit parameter.

Clause 14: The computer of clauses 8-13, wherein determining the plurality of regions of the image comprises utilizing signals for identifying a salient region, an invariant region, a strong line or a subject included in the image.

Clause 15: A computer-readable storage medium (804, 1004) having computer-executable instructions stored thereupon which, when executed by a computer, cause the computer to: obtain data defining an intended use of an image (300); determine a plurality of regions of the image (300) by applying a plurality of signals to the image (300); determine a confidence score for individual regions (401-410) of the plurality of regions (401-410); and generate a plurality of models, wherein individual models of the plurality of models define at least one selected region of the image (300), and wherein the at least one selected region is based on, at least in part, the intended use and the confidence score for the at least one selected region.

Clause 16: The computer-readable storage medium of clause 15, wherein individual models of the plurality of models are generated by applying one or more signals to the image to define the at least one selected region of the image, and wherein the computer-readable storage medium comprises further computer-executable instructions stored thereupon for causing the computer to: determine a signal score for individual models of the plurality of models; filter individual models based on the signal score to determine selected models; and display a transformation of the selected models, wherein an order of the display of the selected models is based on the signal score.

Clause 17: The computer-readable storage medium of clauses 15-16, wherein the computer-readable storage medium comprises further computer-executable instructions stored thereupon for causing the computer to: display a transformation of individual models of the plurality of models; and receive a selection of a signal model of the plurality of models.

Clause 18: The computer-readable storage medium of clauses 15-17, wherein the computer-readable storage medium comprises further computer-executable instructions stored thereupon for causing the computer to: display a transformation of individual models of the plurality of models on an interface; receive, at the interface, a gesture input indicating an intent directed toward one or more regions associated with at least one model; and generate one or more additional models based on the intent in response to the gesture input.

Clause 19: The computer-readable storage medium of clauses 15-18, wherein the computer-readable storage medium comprises further computer-executable instructions stored thereupon for causing the computer to: display a transformation of individual models of the plurality of models; receive an edit parameter for the image; and generate a model based on the edit parameter.

Clause 20: The computer-readable storage medium of clauses 15-19, wherein the computer-readable storage medium comprises further computer-executable instructions stored thereupon for causing the computer to: store data defining the intent in a datastore; obtain data defining a second intended use of a second image; determine a plurality of regions of the second image by applying a plurality of signals to the image, wherein the selection of at least one region of the plurality of regions based, at least in part on the intent; and generate at least one model from the second image based on the plurality of regions of the second image.

Based on the foregoing, it should be appreciated that concepts and technologies have been disclosed herein for optimizing a visual perspective of media. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method comprising:
   obtaining data defining an intended use of an image;
   determining a plurality of salient regions or a plurality of invariant regions of the image by applying a plurality of signals to the image;
   determining a confidence score for at least one salient region or at least one invariant region of the plurality of salient regions or the plurality of invariant regions, wherein the confidence score is based, at least in part on at least one of a size of an identifiable object in the image, a depth of a color or a luminance variation of the image, an existence of identifiable features of the identifiable object, and an image quality of the image; and generating a plurality of models, wherein individual models of the plurality of models focus on the at least one salient region or the at least one invariant region of the image, and wherein a selection of the at least one salient region or the at least one invariant region is based on, at least in part, the intended use and the confidence score for the at least one salient region or the at least one invariant region displaying a transformation of individual models of the plurality of models on an interface;

receiving, at the interface, a gesture input indicating an intent directed toward one or more regions associated with at least one model; and in response to the gesture input, generating additional models based on the intent.

2. The computer-implemented method of claim 1, wherein individual models of the plurality of models are generated by applying one or more signals to the image to define the at least one salient region or the at least one invariant region of the image, and wherein the computer-implemented method further comprises:

determining a signal score for individual models of the plurality of models;

filtering individual models based on the signal score to determine selected models; and displaying a transformation of the selected models, wherein an order of the display of the selected models is based on the signal score.

3. The computer-implemented method of claim 2, wherein the signal score is based on a success rating for the plurality of signals that are applied to the image.

4. The computer-implemented method of claim 1, further comprising:

displaying a transformation of individual models of the plurality of models; and receiving a selection of a single model of the plurality of models.

5. The computer-implemented method of claim 1, further comprising:

displaying a transformation of individual models of the plurality of models;

receiving an edit parameter for the image; and generating an edited model based on the edit parameter.

6. The computer-implemented method of claim 1, wherein determining the plurality of regions of the image comprises utilizing signals for identifying the salient region, the invariant region, a strong line, or a subject included in the image.

7. A computer, comprising:

a processor; and a computer-readable storage medium in communication with the processor, the computer-readable storage medium having computer-executable instructions stored thereupon which, when executed by the processor, cause the computer to obtain data defining an intended use of an image, determine a plurality of regions of the image by applying a plurality of signals to the image, determine a confidence score for individual regions of the plurality of regions, wherein the confidence score is based, at least in part on at least one of a size of an identifiable object in the image, a depth of a color or a luminance variation of the image, an existence of identifiable features of the identifiable object, and an image quality of the image, and generate a plurality of models, wherein individual models of the plurality of models define at least one selected region of the image, and wherein the at least one selected region is based on, at least in part, the intended use and the confidence score for the at least one selected region display a transformation of individual models of the plurality of models on an interface;

receive, at the interface, a gesture input indicating an intent directed toward one or more regions associated with at least one model; and in response to the gesture input, generate additional models based on the intent.

8. The computer of claim 7, wherein individual models of the plurality of models are generated by applying one or more signals to the image to define the at least one selected region of the image, and wherein the computer-readable storage medium has further computer-executable instructions stored thereupon, which when executed by the processor, cause the computer to:

determine a signal score for individual models of the plurality of models;

filter individual models based on the signal score to determine selected models; and display a transformation of the selected models, wherein an order of display of the selected models is based on the signal score.

9. The computer of claim 8, wherein the signal score is based on a success rating for the one or more signals that are applied to the image.

10. The computer of claim 7, wherein the computer-readable storage medium has further computer-executable instructions stored thereupon, which when executed by the processor, cause the computer to:

display a transformation of individual models of the plurality of models; and receive a selection of a single model of the plurality of models.

11. The computer of claim 7, wherein the computer-readable storage medium has further computer-executable instructions stored thereupon, which when executed by the processor, cause the computer to:

display a transformation of individual models of the plurality of models;

receive an edit parameter for the image; and generate an edited model based on the edit parameter.

12. The computer of claim 7, wherein determining the plurality of regions of the image comprises utilizing signals for identifying a salient region, an invariant region, a strong line or a subject included in the image.

13. A computer-readable storage medium having computer-executable instructions stored thereupon which, when executed by a computer, cause the computer to:

obtain data defining an intended use of an image;

determine a plurality of salient regions and a plurality of invariant regions of the image by applying a plurality of signals to the image;

determine a confidence score for at least one salient region or at least one invariant region of the plurality of salient regions or the plurality of invariant regions; and generate a plurality of models, wherein individual models of the plurality of models focus on the at least one salient region or the at least one invariant region of the image, and wherein a selection of the at least one salient region or the at least one invariant region is based on, at least in part, the intended use and the confidence score for the at least one salient region or the at least one invariant region display a transformation of individual models of the plurality of models on an interface;

receive, at the interface, a gesture input indicating an intent directed toward one or more regions associated with at least one model; and in response to the gesture input, generate additional models based on the intent.

14. The computer-readable storage medium of claim 13, wherein individual models of the plurality of models are generated by applying one or more signals to the image to define the at least one salient region or the at least one invariant region of the image, and wherein the computer-readable storage medium comprises further computer-executable instructions stored thereupon for causing the computer to:

determine a signal score for individual models of the plurality of models;

filter individual models based on the signal score to determine selected models; and display a transformation of the selected models, wherein an order of the display of the selected models is based on the signal score.

15. The computer-readable storage medium of claim 13, wherein the computer-readable storage medium comprises further computer-executable instructions stored thereupon for causing the computer to:

display a transformation of individual models of the plurality of models; and receive a selection of a signal model of the plurality of models.

16. The computer-readable storage medium of claim 13, wherein the computer-readable storage medium comprises further computer-executable instructions stored thereupon for causing the computer to:

display a transformation of individual models of the plurality of models;

receive an edit parameter for the image; and generate an edited model based on the edit parameter.

17. The computer-readable storage medium of claim 13, wherein the computer-readable storage medium comprises further computer-executable instructions stored thereupon for causing the computer to:

store data defining the intent in a datastore;

obtain data defining a second intended use of a second image;

determine a second plurality of regions of the second image by applying a second plurality of signals to the second image, wherein selection of at least one region of the second plurality of regions based, at least in part on the intent; and generate at least one model from the second image based on the second plurality of regions of the second image.

* * * * *